United States Patent
Li et al.

(10) Patent No.: US 10,312,805 B2
(45) Date of Patent: Jun. 4, 2019

(54) CURRENT MODE CONTROL DC-DC CONVERTER WITH SINGLE STEP LOAD TRANSIENT RESPONSE

(71) Applicant: Virginia Tech Intellectual Properties, Inc., Blacksburg, VA (US)

(72) Inventors: Virginia Li, Blacksburg, VA (US); Pei-Hsin Liu, Blacksburg, VA (US); Qiang Li, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 6 days.

(21) Appl. No.: 15/075,553

(22) Filed: Mar. 21, 2016

(65) Prior Publication Data

US 2016/0294278 A1 Oct. 6, 2016

Related U.S. Application Data

(60) Provisional application No. 62/142,048, filed on Apr. 2, 2015.

(51) Int. Cl.
*H02M 3/156* (2006.01)

(52) U.S. Cl.
CPC .... *H02M 3/156* (2013.01); *H02M 2003/1566* (2013.01)

(58) Field of Classification Search
CPC ...................................................... H02M 3/04
See application file for complete search history.

(56) References Cited

U.S. PATENT DOCUMENTS

| | | | | |
|---|---|---|---|---|
| 5,627,460 A | * | 5/1997 | Bazinet ................ | G05F 1/618 323/224 |
| 2007/0103949 A1 | * | 5/2007 | Tsuruya .............. | H02M 1/4225 363/125 |
| 2009/0028273 A1 | * | 1/2009 | Lin .................... | H04L 25/4902 375/324 |
| 2009/0243580 A1 | * | 10/2009 | Chen .................... | H02M 3/156 323/288 |
| 2011/0109363 A1 | * | 5/2011 | Chen .................... | H02M 3/156 327/178 |
| 2011/0316503 A1 | * | 12/2011 | Huang ................ | H02M 3/1584 323/271 |
| 2013/0082675 A1 | * | 4/2013 | Capodivacca ......... | G05F 1/468 323/283 |
| 2013/0207625 A1 | * | 8/2013 | Futamura ................ | G05F 1/10 323/271 |
| 2013/0241516 A1 | * | 9/2013 | Ueno .................... | G05F 1/618 323/285 |

(Continued)

*Primary Examiner* — Jue Zhang
*Assistant Examiner* — Trinh Q Dang
(74) *Attorney, Agent, or Firm* — W & C IP

(57) ABSTRACT

A power converter using constant on-time (COT) or ramp pulse modulation (RPM) control achieves more rapid resumption of steady-state operation after a step-up load transient by extending an on-time of a switching pulse by interrupting a ramp voltage waveform that is compared with a threshold that equals a threshold voltage at the termination of a switching pulse or increasing a voltage with which the ramp voltage is compared. These techniques are applied to both single-phase and multi-phase power converters.

20 Claims, 25 Drawing Sheets

(56) References Cited

U.S. PATENT DOCUMENTS

| | | | | |
|---|---|---|---|---|
| 2015/0180335 A1* | 6/2015 | Takada | .................. | H02M 3/156 323/288 |
| 2015/0378378 A1* | 12/2015 | Zhang | ....................... | G05F 1/56 323/280 |
| 2016/0164414 A1* | 6/2016 | Hang | .................. | H02M 3/1584 323/271 |

* cited by examiner

CURRENT MODE CONTROL DC-DC CONVERTER WITH SINGLE STEP LOAD TRANSIENT RESPONSE

CROSS-REFERENCE TO RELATED APPLICATIONS

This application claims benefit of priority of U.S. Provisional Application 62/142,048, filed Apr. 2, 2015, which is hereby incorporated by reference in its entirety.

FIELD OF THE INVENTION

The present invention generally relates to DC-DC power converters and, more particularly, DC-DC power converters having fast response to load transients.

BACKGROUND OF THE INVENTION

At the present time, most electrical power is generated and distributed as alternating current (AC) power for reasons of convenience and economy since AC power can be distributed at high voltage to reduce current and losses over power lines of reduced cost and the voltage locally reduced by transformers even though most electrical and electronic devices other than motors operate from a relatively constant voltage referred to as direct current (DC) which can be produced from an AC power source through use of simple rectifier devices or arrangements. Recently, however, there has been increased interest in substantially local generation of power from so-called renewable resources such as solar collectors and wind turbines that generally are arranged to produce DC power at a relatively high voltage which can be efficiently distributed and/or stored locally to the point of power generation; requiring the voltage to be reduced and usually regulated within a small voltage tolerance for operation of many electronic devices through use of DC-DC converters.

While many designs and approaches to DC-DC conversion have become known and accommodate the power requirements of various electronic devices relatively well, there is an increasing need for extremely rapid response to changes in the electrical load presented by the device to which power is being supplied. For example, digital data processing devices have become ubiquitous in many electrical and electronic devices to increase functionality and ease of use but present loads which can vary from very low currents in a stand-by or so-called "sleep" state to currents of many Amperes when operating at full clock cycle speeds which have greatly increased in recent years. The problem of rapid transient response has proven to be largely intractable, particularly in switching power converters and regulators which, in addition to delays in signal propagation time to alter switching parameters, require several switching cycle periods to make large step-up changes in steady-state current. Therefore, the increase in load current occurs in steps to reach an increased steady-state current which cannot be optimally rapid since each switching cycle will include some finite period(s) when the input power is interrupted.

SUMMARY OF THE INVENTION

It is therefore an object of the present invention to provide a DC-DC converter having an arbitrary switching mode control which can provide transient response with increased rapidity in a single step.

It is another object of the invention to provide a power converter control methodology to provide single-step transient response in power converters having different control mode arrangements, different topologies and/or single or multiple phases which may or may not be interleaved.

In order to accomplish these and other objects of the invention, a power converter is provided comprising a pulse generator for generating pulses for controlling connection of the power converter to a power source based on a comparison of and output voltage of the power converter with a reference voltage, a circuit for developing a control voltage corresponding to a combination of input voltage, output voltage and inductor current of the power converter, a detector for determining when the voltage corresponding to input voltage, output voltage and inductor current of the power converter represents a step-up transient, and a control circuit responsive to the detector for maintaining a switching pulse while an output of the detector indicates a step-up transient.

In accordance with another aspect of the invention, a method of operating a power converter is provided comprising steeps of generating pulses for controlling a switch to connect the power converter to a power source, detecting a step-up load transient in the power converter, and extending a pulse for controlling the switch for a duration of a the step-up transient.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
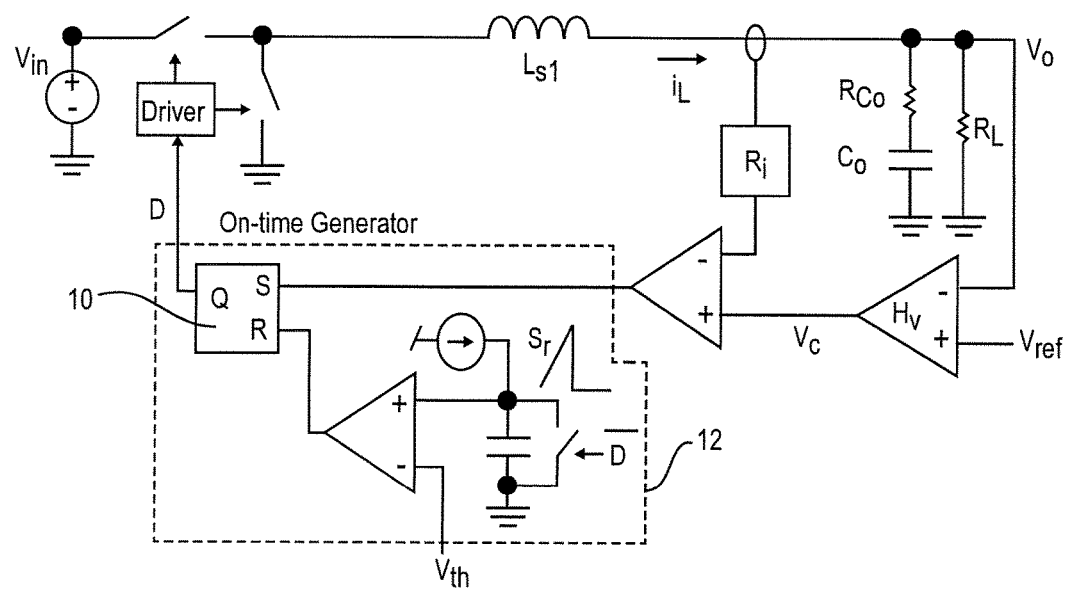
FIGS. 1 and 2 illustrate a general control scheme and steady-state waveforms of a constant on-time (COT) power converter, respectively.
Figure 2:
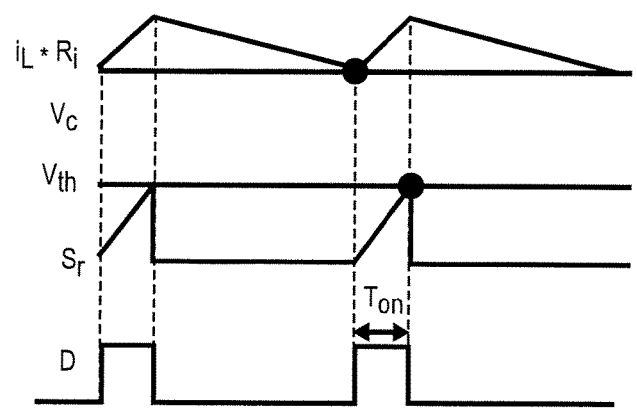
Figure 3:
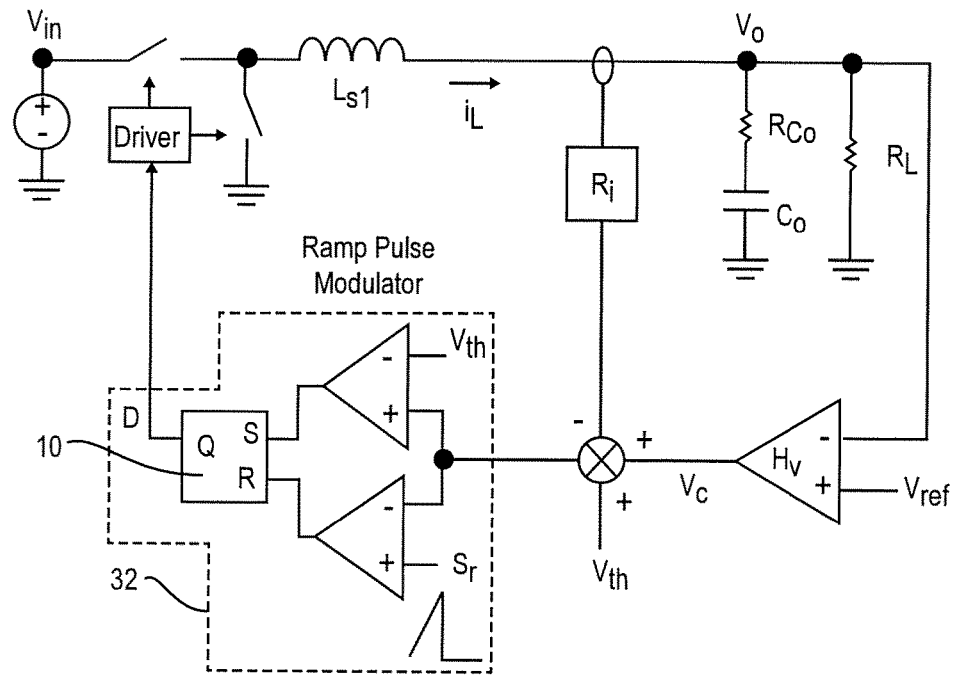
FIGS. 3 and 4 illustrate a general control scheme and steady-state waveforms of a ramp pulse modulation (RPM) power converter, respectively.
Figure 4:
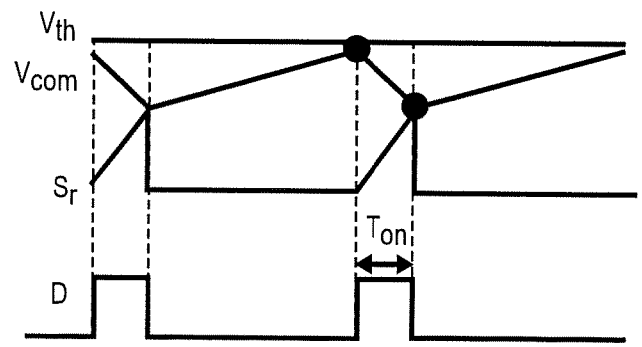
Figure 5:
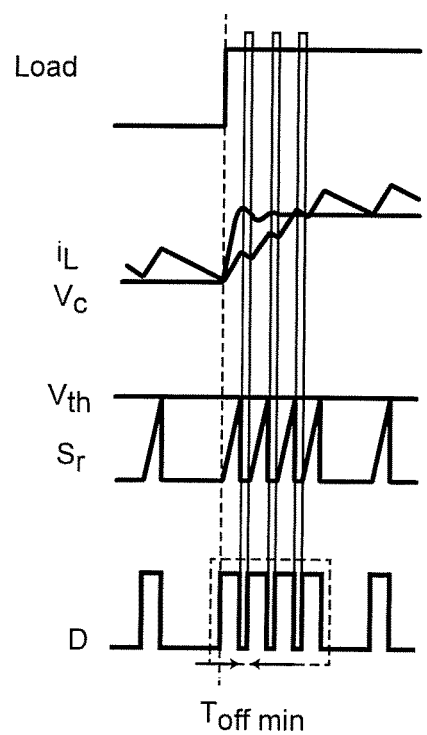
FIGS. 5 and 6 illustrate step-up and step-down transient operation of a COT power converter, respectively.
Figure 6:
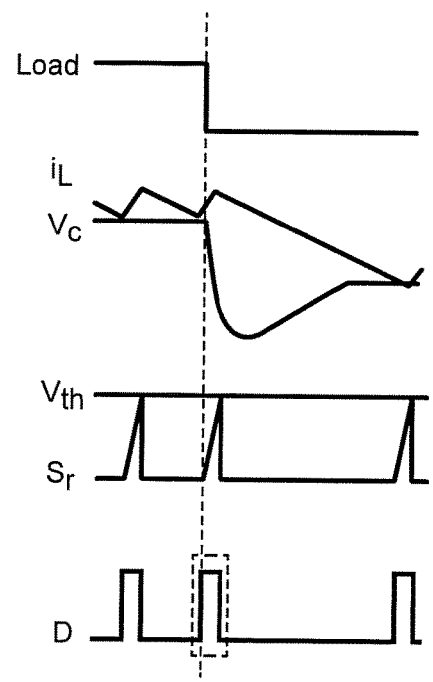
Figure 7:
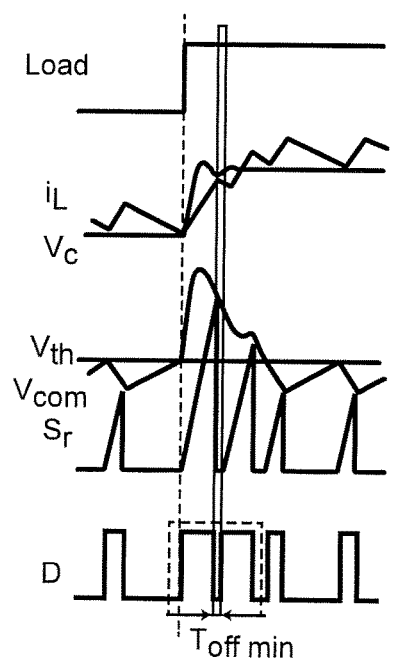
FIGS. 7 and 8 illustrate step-up and step-down transient operation of an RPM power converter, respectively.
Figure 8:
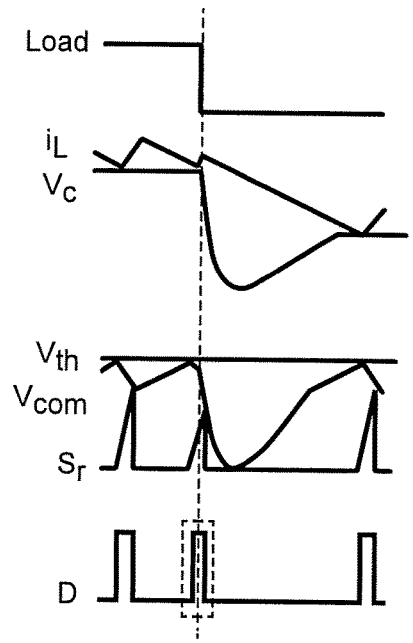
Figure 9:
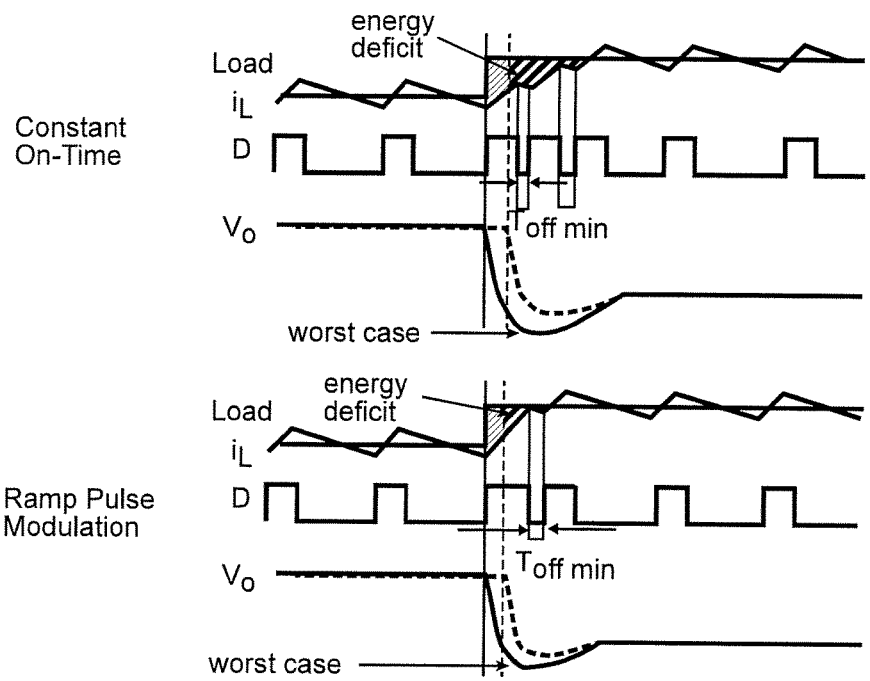
FIGS. 9 and 10 illustrate load step-up and load step down behaviors of COT and RPM power converters when a step-up and step-down load transient occurs near the beginning of or during an "on" switching period, respectively, FIGS. 11 and 12 respectively illustrate an enhanced control scheme and transient waveforms of a hybrid COT/RPM power converter to improve steady-state performance while maintaining the more rapid transient response of RPM control.
Figure 10:
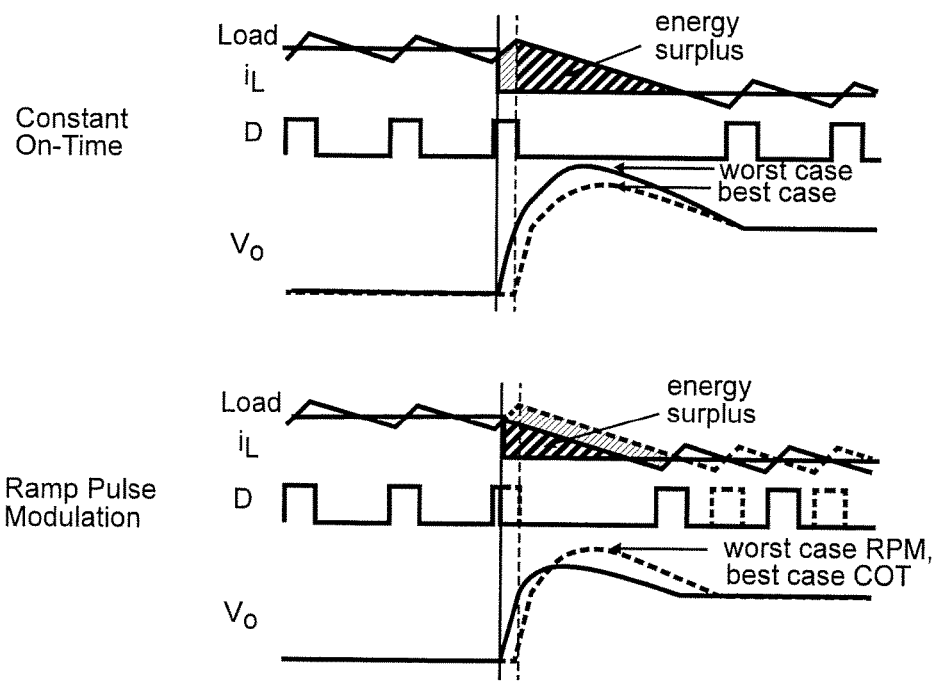

Referring now to the drawings, and more particularly to FIG. 1, there is schematically shown a generalized control scheme for a constant on-time (COT) power converter. Steady-state operational waveforms of the generalized control arrangement of FIG. 1 is illustrated in FIG. 2. A similar generalized control scheme for a ramp pulse modulation (RPM) power converter and corresponding waveforms are illustrated in FIGS. 3 and 4, respectively. Step-up and Step-down transient waveforms for a COT power converter are illustrated in FIGS. 5 and 6, respectively, and corresponding transient waveforms for an RPM power converter are illustrated in FIGS. 7 and 8, respectively. It should be understood that these Figures are generalized and arranged to facilitate an understanding of the problems addressed by the invention and an appreciation of the performance improvements produced by the invention. Therefore, although the invention is not illustrated in these Figures, no portion of any of FIGS. 1-8 is admitted to be prior art in regard to the present invention and these Figures have therefore been labeled as being "Related Art". Similarly, FIGS. 9 and 10 depict the performance of the generalized COT and RPM control arrangements of FIGS. 1-8 and FIGS. 11 and 12 depict an enhancement to steady-state performance (as distinct from improved transient performance to which the present invention is directed) that is known to have been proposed but not admitted to be prior art as to the present invention and are similarly labeled as "Related Art".

It should also be understood that while the invention will be described in connection with a power converter having a so-called buck topology and COT or RPM current mode control for simplicity and familiarity, the invention in accordance with its most basic principles is entirely applicable to any switched power converter topology and any current mode control arrangement; a buck converter being among the simplest of popular power converter topologies and COT and RPM being popular for their comparatively fast transient response prior to the improvements achieved in accordance with the invention. COT power converters provide switching pulses, D, having a constant duration, $T_{on}$, of the power converter being connected to and receiving power from a DC source and varying switching frequency to maintain regulation as the input voltage, $V_{in}$, and output voltage, Vo, vary relative to each other, generally due to changes in the power required by a load (with Vo being held substantially constant) by initiating a switching pulse when Vo falls below a threshold, $V_{ref}$. RPM power converters operate similarly to COT converters in regard to providing variable frequency operation but $T_{on}$ also varies by determining both turn-on and turn-off times of the switching pulses based on current and voltage levels in the RPM power converter. Accordingly, the transient performance of an RPM control scheme is somewhat better than that of a COT control scheme as will be discussed in greater detail below.

More specifically, in a COT power converter the beginning of $T_{on}$ is determined by the sensed inductor current signal, $i_L R_i$, compared with the compensator voltage $V_c$, derived by comparing Vo and $V_{ref}$ as shown in FIG. 1 to set latch 10. The end of $T_{on}$ is determined by a threshold voltage, $V_{th}$, compared with an externally generated ramp voltage of constant slope, $S_r$, to reset latch 10 as shown at constant on-time generator 12 to achieve pulses of constant duration as shown in FIG. 2. The ramp slope generator begins a ramp waveform when latch 10 is set and is reset concurrently with the COT pulse termination. In an RPM power converter as shown in FIG. 3, the beginning of $T_{on}$ is determined by $V_{th}$ compared with a voltage $V_{com}$ which is the difference between $V_c$ and $i_L R_i$ and the end of $T_{on}$ is determined by a comparison of $V_{com}$ and $S_r$ as shown at ramp pulse modulator 32 in FIG. 3 and the waveforms of FIG. 4. Essentially, ramp pulse modulator 32 exploits the variation in $V_{com}$ (principally due to the change in $V_c$ since the inductor current cannot increase rapidly enough to follow the transient) to a value outside the range of voltages $V_{com}$ may assume during steady-state operation by comparing $V_{com}$ with both a threshold voltage, $V_{th}$, and the ramp voltage $S_r$, and sets latch 10 when $V_{th}$ is exceeded and resets latch 10 when the ramp voltage, $S_r$, equals $V_{com}$ to extend the duration of $T_{on}$ during transients. Accordingly, it is clearly seen that while the COT generator 12 and the ramp pulse modulator both perform comparison functions to set and reset a latch 10, the ramp pulse modulator 32 utilizes two comparators and can both truncate or extend the switching pulse duration while the COT generator 12 requires only one to initiate a constant duration switching pulse when current is needed to maintain Vo. The steady-state performance of COT and RPM control schemes are therefore somewhat similar since, at steady-state, $T_{on}$ will assume a near-constant value under the RPM control scheme. However, the transient responses are somewhat different and a comparison of COT and RPM transient response waveforms clearly reveals the limitations of COT control.

As shown in FIG. 5, for a step-up load transient, the duty cycle saturates (e.g. with a finite minimum off-time between pulses) causing Vo to exhibit undershoot because of the limitation of energy transfer to the power converter output. Conversely, as shown in FIG. 6, energy transfer to the output may continue after a step-down transient due to the continuation of a constant on-time pulse width. For an RPM control scheme during a step-up load transient, $T_{on}$ is extended due to the behavior of $V_{com}$ which operates above the steady-state range (e.g. the bounding range of values $V_{com}$ may exhibit during steady-state operation) as shown in FIG. 7. Conversely, during a step-down transient, $V_{com}$ operates below the steady-state range, as shown in FIG. 8, to reduce $T_{on}$ by truncating a switching pulse and preventing switching pulses until $V_{com}$ returns to a value within the steady-state operation range. Therefore, while RPM control produces better transient performance than COT control, the transient responses are somewhat similar in extending the transient period and producing overshoot and undershoot of Vo (which has a waveform shape generally complementary to that of $V_c$ due to the comparison with $V_{ref}$). However, the magnitudes of overshoot and undershoot of Vo will differ between COT and RPM control and also with the timing of a load transient relative to the beginning or end of a $T_{on}$ period, respectively. That is, for a step-up load transient, the worst case Vo performance for both COT and RPM control schemes is produced when the transient occurs at the beginning of $T_{on}$ as shown in FIG. 9. Additionally, for step-down load transients, the worst case Vo performance for COT control is produced when the transient occurs at the beginning of $T_{on}$ but, for RPM control, the worst case performance is produced when the transient occurs at the end of $T_{on}$. Further, for RPM control, since the worst case step-down load transient performance is produced when the step-down transient occurs after the end of a $T_{on}$ period, performance improvement cannot be obtained through use of controls for the power converter. Additionally, while RPM control produces better overall transient performance than COT control, RPM control is also subject to duty cycle jittering and some inherent instability of output voltage or regulation accuracy due to noise superimposed or developed by generation of the $V_{com}$ signal.

It should be noted from FIG. 10 that, for COT control, if a step-down transient occurs at or near the beginning of a constant on time switching pulse, the switching pulse will continue and an energy surplus will be delivered to the output with the worst case Vo performance (solid Vo curve) and greatest energy surplus delivered when the step-down transient is coincident in time with the beginning of a switching pulse. Conversely, the best case step-down transient performance (dashed Vo curve) will occur when the step-down transient occurs at or after the end of a switching pulse and the next switching pulse will simply be delayed until the inductor current reaches a steady-state value to satisfy the required (reduced) load. In sharp contrast therewith, for RPM control, the best case step-down transient performance of Vo (solid Vo curve) will be provided when the step-down transient occurs during a switching pulse, particularly near the beginning of a switching pulse such that RPM control can truncate a switching pulse coincident with the step-down transient to limit the energy surplus. The energy surplus will increase if the step-down transient occurs later during the switching pulse and will be maximized if the step-down transient occurs coincident with the end of the switching pulse; yielding worst-case step-down transient Vo performance (dashed Vo curve).

In this regard, it should be particularly noted from a comparison of the upper (COT) and lower (RPM) sets of waveforms of FIG. 10, that the energy surplus for the worst case RPM control step-down transient performance and the operation of an RPM control power converter is exactly the same as the best case step-down transient performance and operation of a COT control power converter. Therefore, an RPM converter will consistently and unconditionally provide step-down transient performance which is at least equal to or better than a COT control power converter and even the worst case step-down transient performance of an RPM control power converter is not a significant problem in most cases.

Figure 11:
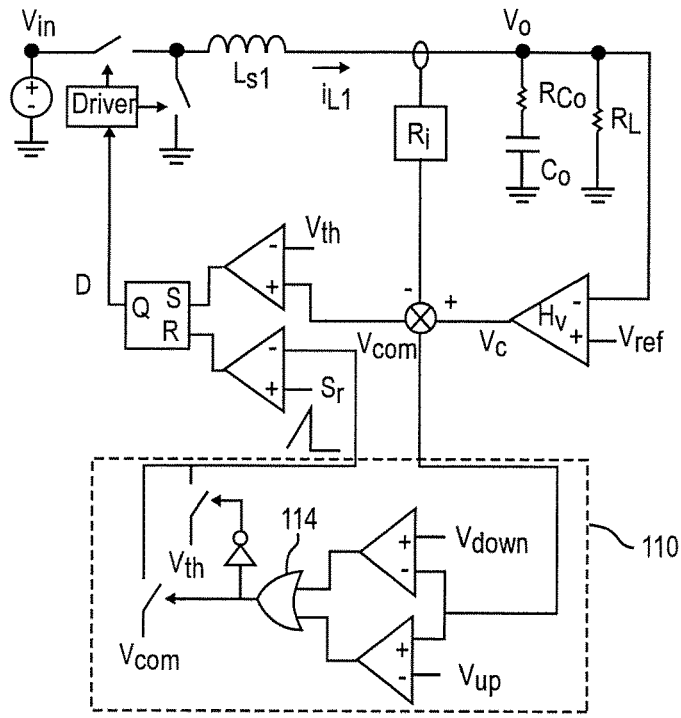
Figure 12:
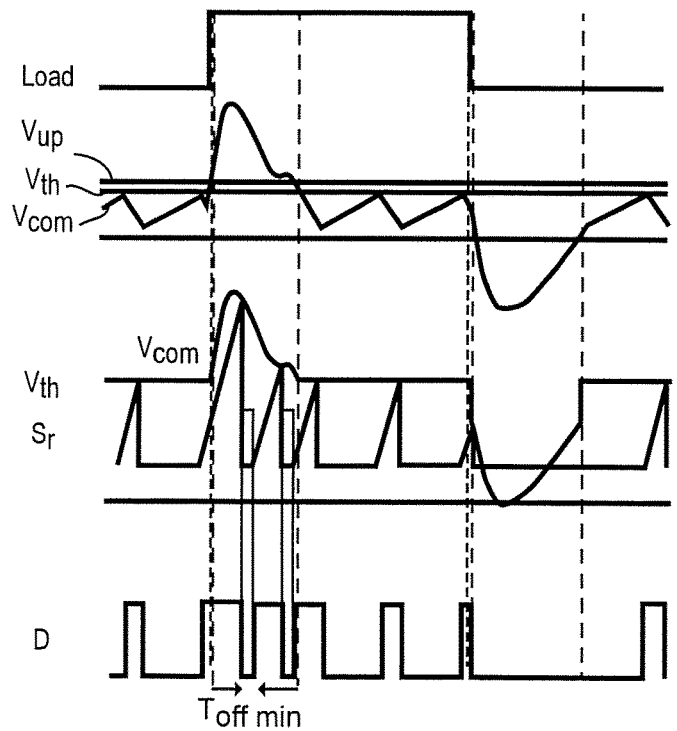

Referring now to FIGS. 11 and 12, a schematic diagram and transient waveforms of an enhanced hybrid COT and RPM control scheme are illustrated, respectively. As alluded to above, $V_{com}$ is bounded by and will vary within a narrow range of voltage during steady-state operation but will assume a value outside that narrow range during load transients. Comparing FIG. 11 to FIGS. 1 and 3, it will be seen that $V_{com}$ is provided as an input to an additional two comparators that compare $V_{com}$ to the voltage limits (e.g. $V_{up}$, set slightly above $V_{th}$, and $V_{down}$, set at or slightly below the minimum of $V_{down}$, the slight difference, if any, can be empirically determined or set based on a trade-off between the response speed and the likelihood of false transient detection while $V_{th}$ and $V_{com}$ can be numerically determined) of the steady-state operation range as shown at 110. While $V_{com}$ remains within the steady-state operation voltage range gate 114 supplies $V_{th}$ for comparison with $S_r$ in a manner similar to the COT arrangement sown in FIG. 1 and discussed above but supplies $V_{com}$ to that comparator for comparison with $S_r$ in a manner similar to the RPM arrangement of FIG. 3 when $V_{com}$ has a value outside that range as functionally indicated by the switches and inverter within dual comparator 110. Therefore, the power converter illustrated in FIG. 11 functions under COT mode control during steady-state operation to avoid the jittering of switching pulse duration and compromise of regulation accuracy alluded to above as being characteristic of RPM control as an enhancement thereof but functions under RPM control during both step-up and step-down load transients (When $V_{com}$ is reduced below the steady-state range and switching pulses are truncated or prevented or when the value of $V_{com}$ is large and $T_{on}$ pulses separated by minimum off-time periods, $T_{off\_min}$, are extended until steady-state operation is again reached and COT mode control resumed; the extension of each $T_{on}$ pulse diminishing as $V_{com}$ approaches $V_{th}$ as steady-state operation is approached; rendering noise substantially ineffective to cause jitter and unimportant to the extension of $T_{on}$ pulse durations (since the inaccuracy due to noise is insignificant) to obtain more rapid return to steady-state operation following a load transient in accordance with RPM control. It should be understood, however, that the important enhancement for RPM mode control provided is freedom from jitter and stability and accuracy of regulation during steady-state operation. However, transient response of the power converter of FIG. 11 is not affected and is not optimally rapid or improved in any way over RPM control as discussed above in connection with FIGS. 3-10 since return to steady-state following a load transient continues to occur in steps.

Figure 13:
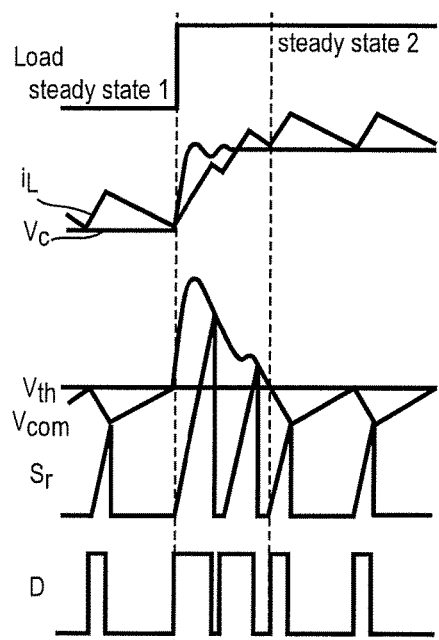
FIG. 13 illustrates load step-up transient waveforms to identify the duration of a transient, FIGS. 14 and 15 respectively illustrate operation of a control scheme and transient waveforms of an RPM power converter in accordance with the invention.

Conversely, load transient response can only be optimally rapid when steady-state operation is again reached in a single step or extended $T_{on}$ period without interruption. By the same token, the duration of the $T_{on}$ period must be determined accurately to prevent undershoot or overshoot. The required $T_{on}$ duration will vary with both the magnitude of the load transient and the timing relative to the beginning or end of a $T_{on}$ pulse, as discussed above in connection with FIGS. 9 and 10. Since the voltage $V_{com}$ will be within closely defined limits during steady-state operation and outside the limits of that voltage range during transients, the duration of $V_{com}$ being outside the steady-state operation voltage range can be used as a measurement of the duration of a load transient as shown in FIG. 13 and can be determined in a manner somewhat similar to that discussed above in connection with FIGS. 11 and 12 but with a much different purpose and function. That is, the duration of the load transient is substantially equal to the length of a pulse that is required to bring the power converter back to steady-state operation following a load transient in a single step without overshoot or undershoot and provides a very simple control technique and circuit function to provide such a meritorious result. Moreover, since the step-down transient performance cannot be enhanced by control of switching pulses, as described above, and is not generally a significant problem for most applications, only the duration of a step-up transient need be determined; which determination can be made with a single comparator in a manner and implementation much simpler than that of FIG. 11 which demonstrates that $V_{com}$ is a good candidate for detection of a step-up transient since $V_{com}$ naturally increases beyond the upper bound of $V_{th}$ during step-up transients because, while inductor current cannot follow the step-up load change, $V_c$ is capable of doing so due to high bandwidth design of the voltage loop compensator arrangement, $H_v$. As a result, $$V_{com} = V_{th} + V_c - i_L R_i$$

is naturally able to naturally increase above $V_{th}$ until steady-state operation is again achieved as shown in FIG. 13.

Figure 15:
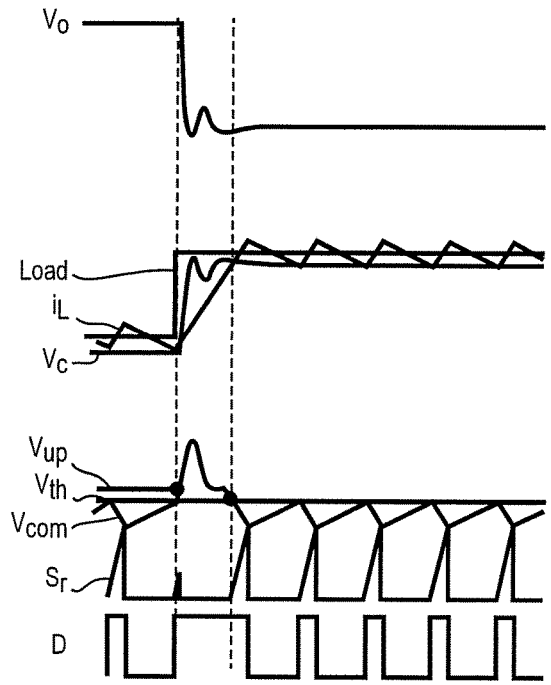
Figure 14:
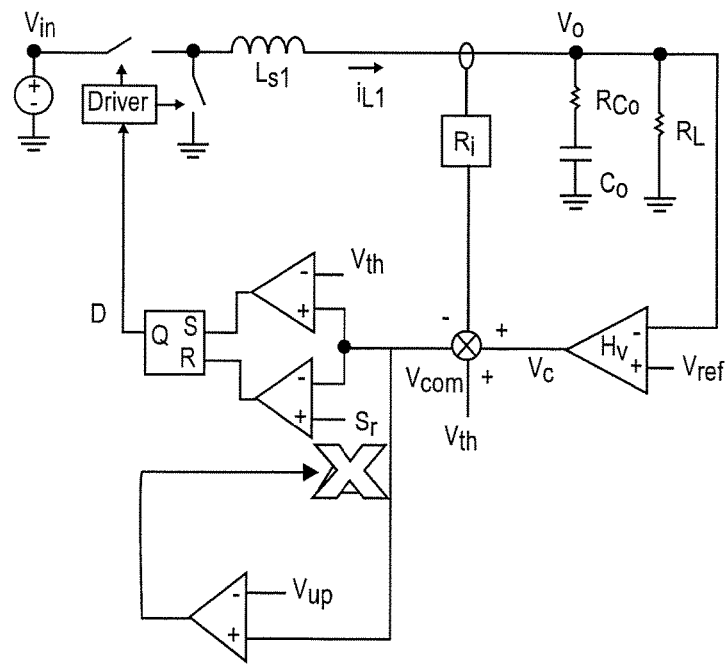

Specifically, the $T_{on}$ pulse can be extended for the correct duration to achieve return to steady-state operation in a single step (and optimally short time) following a step-up load transient simply by disabling $S_r$ for precisely the duration of the step-up load transient as shown in FIGS. 14 and 15. The beginning of the transient can be detected by using a $V_{up}$ value threshold which is slightly higher than $V_{th}$ and disabling $S_r$ when $V_{com}$ is greater than $V_{up}$ to modify the turn-off mechanism for the switching pulse until $V_{com}$ decreases below $V_{th}$ (or $V_{up}$) and steady-state operation is resumed with switching pulse turn-off times determined by a comparison with $S_r$.

Figure 16:
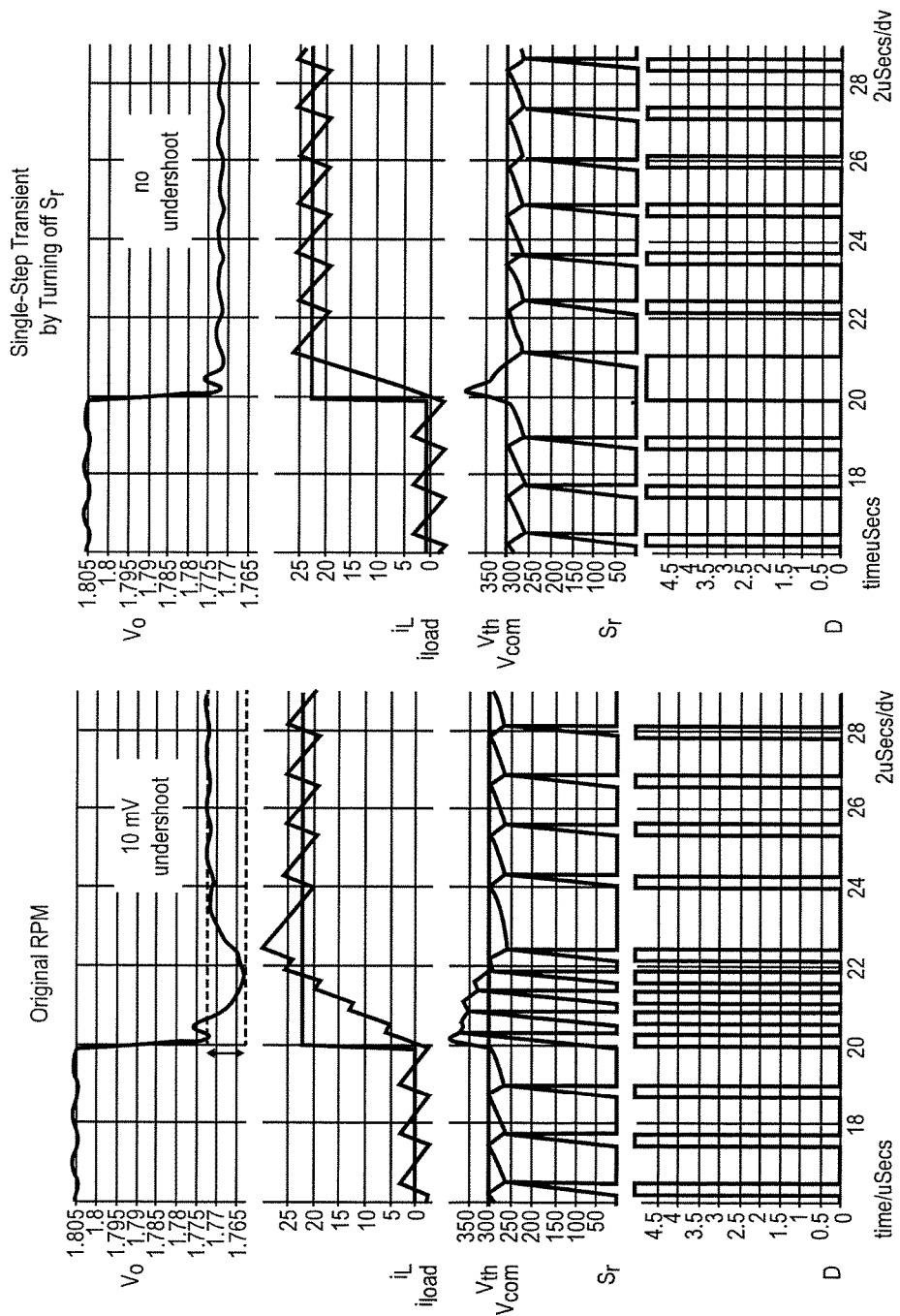
FIG. 16 illustrates waveforms of a step-up transient response of an RPM power converter without and with the invention.
Figure 17:
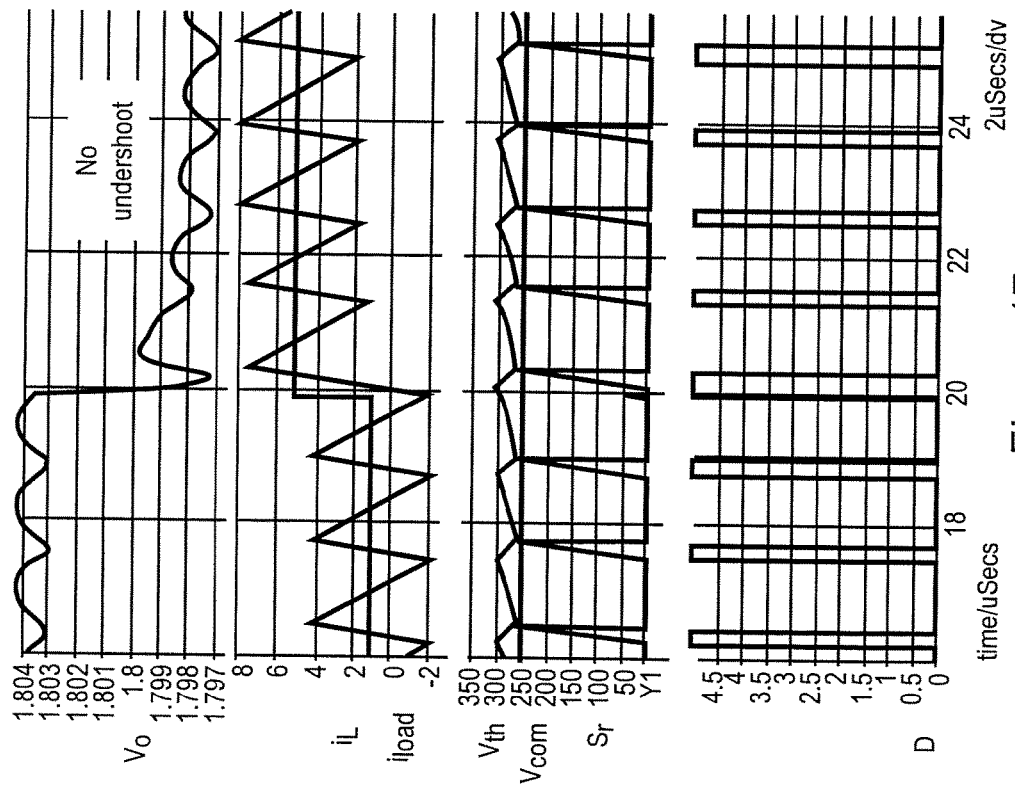
FIG. 17 illustrates step-up transient waveform response of an RPM power converter similar to that of FIG. 16 for a load transient of reduced magnitude, FIGS. 18 and 19 respectively illustrate a control scheme and step-up transient waveforms for a COT power converter in accordance with the invention.

An exemplary arrangement for achieving such a control function in an RPM control power converter is schematically illustrate in FIG. 14. It will be recognized from a comparison with FIG. 3 that $V_{com}$ and $V_{up}$ are compared at comparator 141 and an output thereof provided as an input to an OR gate 142 which also receives the inverse of switching pulse D as an input preventing the generation of a ramp waveform (schematically illustrated by the serial connection of a current source and parallel connection of a capacitor and switch for discharging the capacitor when the ramp generator is to be reset or disabled). The output of comparator 141 will be terminated prior to $V_{com}$ decreasing to $V_{th}$ but the inverse of the switching pulse D will not be asserted until $V_{com}$ decreases to $V_{th}$ as shown in FIG. 15, causing the switching pulse to be extended after the resumption of operation and comparison of $V_{com}$ with $S_r$ under steady-state operation. Simulations of the operation of RPM control power converters in accordance with FIGS. 3 and 14 has been performed using circuit and operational parameters of $V_{in}=8.4V$, $V_o=1.8V$, $T_{off\_min}=200$ ns, $L=280$ nH, $f_s=800$ kHz, load step-up=22 A and di/dt=320 A/μs. A comparison of the waveforms resulting from these simulations are compared in FIG. 16 from which it can be observed that the invention achieves single step RPM and no undershoot is observed under the worst case scenario. FIG. 17 illustrates the waveforms resulting from a simulation of operation of the power converter of FIG. 14 using the same circuit and operating parameters as in FIG. 16 but with a much smaller step-up transient. of 4 A. It will be noted From FIG. 17 that the excursion of $V_{com}$ above $V_{th}$ is very slight with termination of a ramp waveform followed by a slightly delayed ramp $S_r$ (both encircled in FIG. 17) and a very slightly extended switching period, D. It should be appreciated, particularly from FIG. 17, that the placement of $V_{up}$ relative to $V_{th}$ is substantially more critical (and exaggerated in FIG. 15 for clarity) that in the enhanced RPM power converter of FIG. 11 although some variation is possible and suitable values can be empirically determined. If $V_{up}$ is too close to $V_{th}$, noise in $V_{com}$ may cause false transient detection and if too high small transient steps may not be detected. Nevertheless some voltage tolerance is provided.

Figure 18:
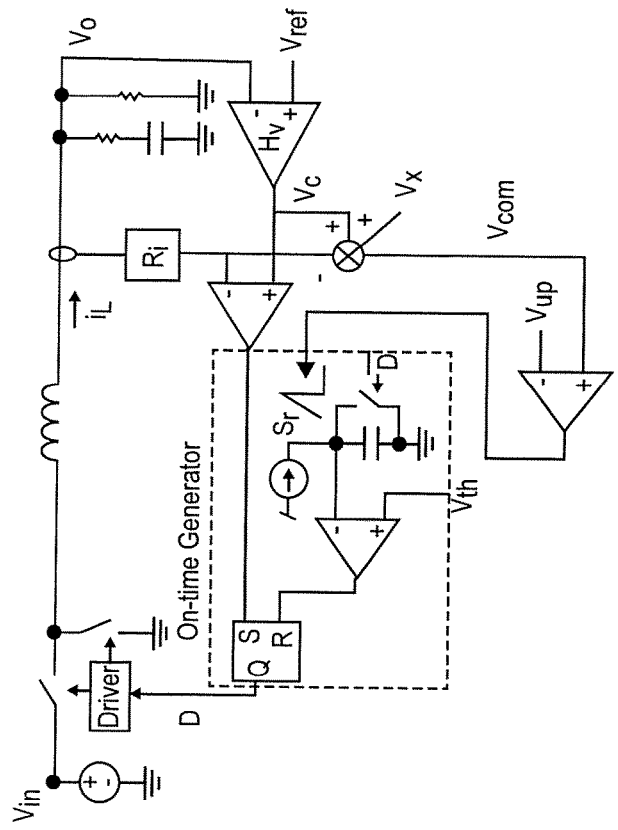
Figure 19:
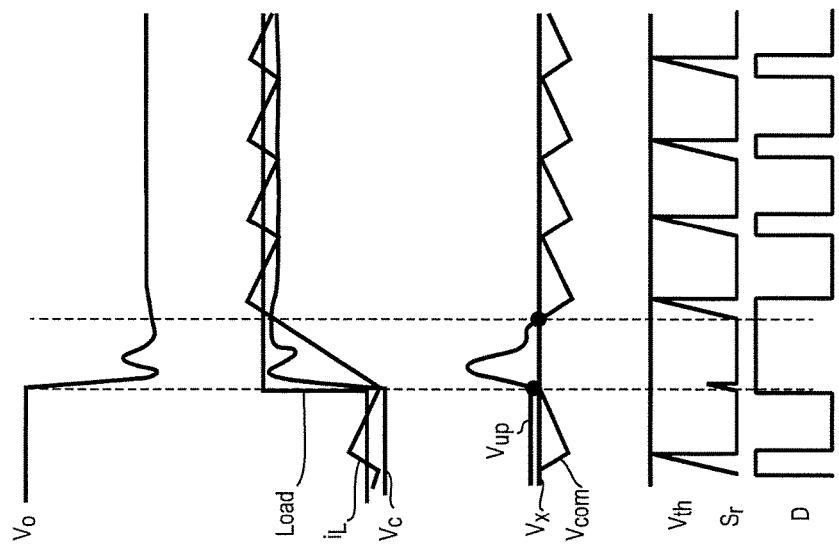

The methodology and circuit operation can also be applied to a COT power converter as shown in FIGS. 18 and 19. From a comparison of the schematic diagram of FIG. 18 with that of FIG. 1 it is readily seen that the schematic diagram of FIG. 18 includes a circuit for developing a $V_{com}$ signal which is not used in the COT power converter of FIG. 1. However, this circuit may be embodied by a simple analog mixer circuit and does not present a significant complication of a simple COT power converter. The other additional circuitry beyond that of FIG. 1 is essentially the same as that of FIG. 14 for disabling the ramp waveform generator $S_r$ and need not be discussed further. The waveforms for a step-up transient and return to steady-state operation are shown in FIG. 19. It should be noted from the exemplary timing shown, the ramp waveform is terminated in a manner similar to the invention as applied to RPM operation upon detection of a step-up transient. Criticality of the location of $V_{up}$ is precisely the same as described above and also can be determined empirically.

Figure 21:
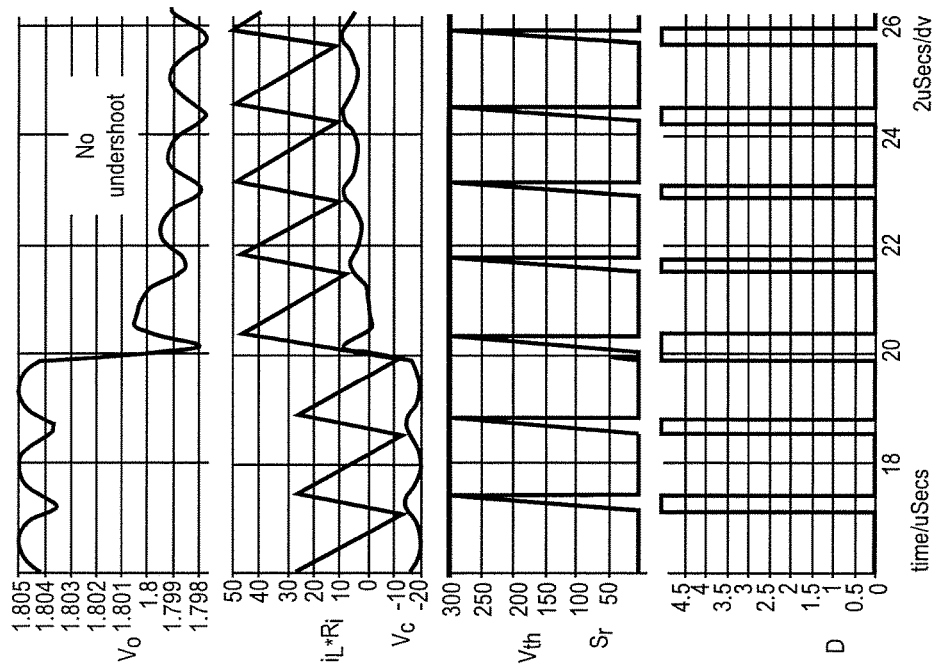
FIG. 21 illustrates step-up transient waveform response of a COT power converter similar to that of FIG. 16 for a load transient of reduced magnitude.
Figure 20:
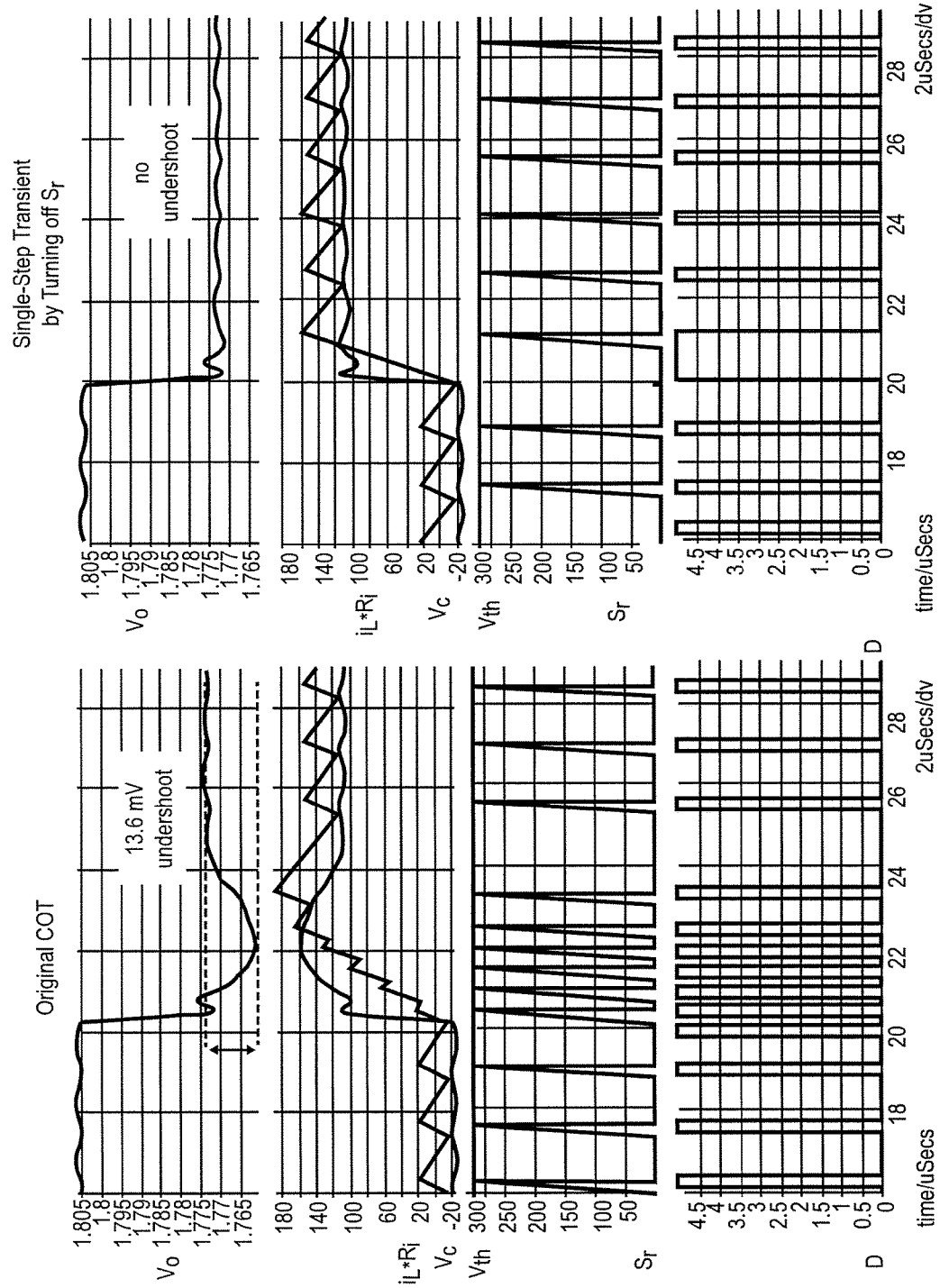
FIG. 20 illustrates waveforms of a step-up transient response of a COT power converter without and with the invention.

FIG. 20 compares simulated waveforms of the circuit of FIG. 1 with the circuit of FIG. 18 under the same conditions as before and exhibits an absence of Vo undershoot clearly observable in the simulated waveforms of FIG. 1. FIG. 21 illustrates a simulation under the same conditions and circuit and operating parameters as FIG. 20 and confirms not only the waveforms of FIG. 19 but that the freedom from undershoot is achieved even with very small step-up transients.

Figure 22:
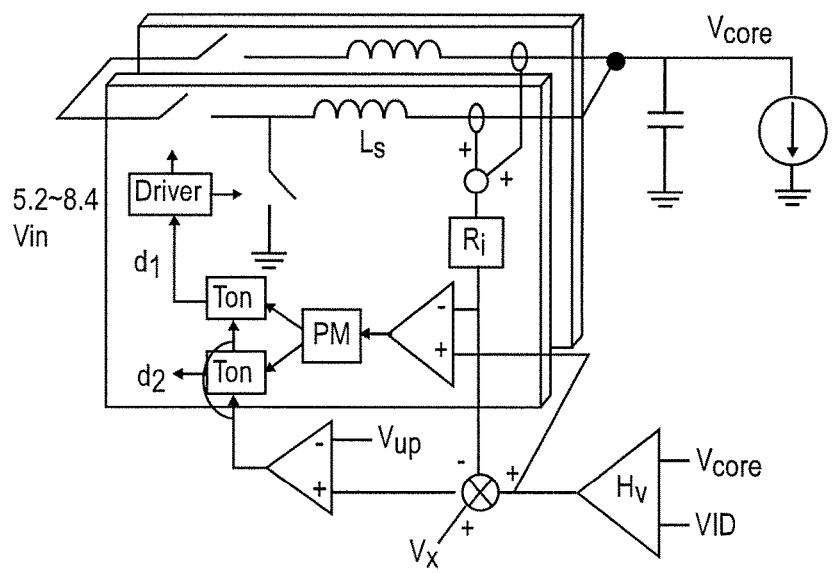
FIG. 22 is a schematic illustration of application of the single-step transient arrangement in accordance with the invention to a two-phase COT power converter.
Figure 23:
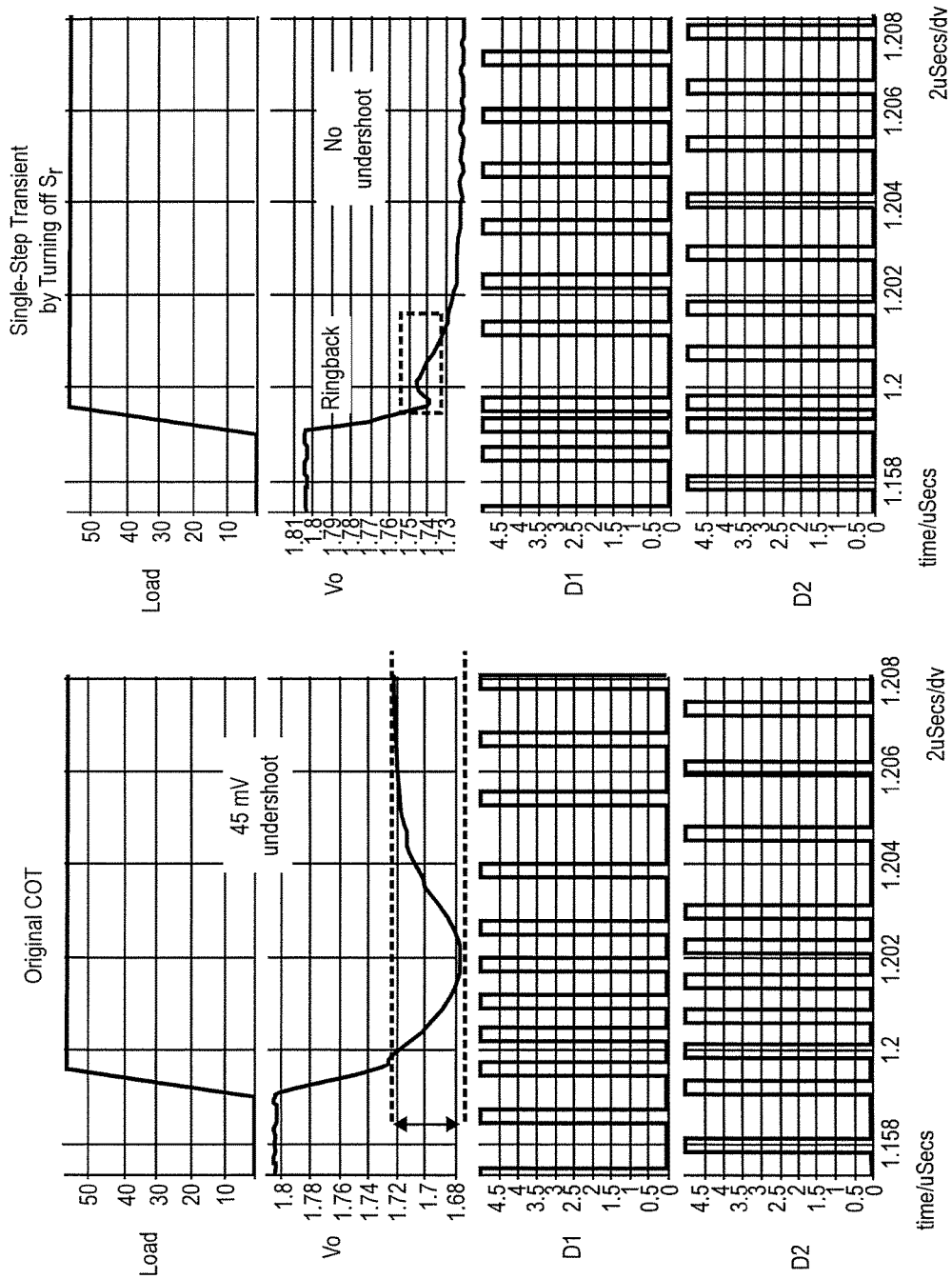
FIG. 23 illustrates a comparison of step-up transient waveforms of a two-phase COT power converter without and with the single step transient arrangement in accordance with the invention, FIGS. 24A and 25A respectively illustrate a variant form of the invention including substitution of a high voltage for a threshold voltage for determining switching pulse termination in an RPM control converter, FIGS. 24B and 25B respectively illustrate a variant form of the invention including an injected feedback signal for determining switching pulse termination in an RPM control converter.

The single step step-up transient power converter response improvement can be further extended to multi-phase power converters and operation. A schematic diagram of an exemplary two-phase embodiment is shown in FIG. 22. It should be noted that FIG. 22 includes a phase manager, PM, which controls the interleaving of phases, as is generally provided in multi-phase power converters. Such interleaving provides a more evenly distributed transfer of power from input to output of the multi-phase power converter since the switching pulse durations can be evenly overlapped. For multi-phase COT embodiments, a $V_{com}$ signal must be developed. However, unlike the application to single phase COT power converters, the sum of the inductor currents, $i_{sum}R_i$ is used for modulation and $$V_{com} = V_x + V_c - i_{sum} R_i$$

where $V_x$ is an arbitrary DC offset to bring it to a positive voltage range since it serves the same context as the $V_{th}$ component of $V_{com}$ in single phase embodiments. During steady-state operation, the upper bound of $V_{com}$ is $V_x$ and when a step-up transient occurs, $V_{com}$ increases above $V_x$ with $V_{up}$ set slightly above $V_x$ with the same criticality and small tolerance as discussed above. It should be noted that the $V_{core}$ and VID inputs shown in FIG. 22 correspond to the Vo and $V_{ref}$ inputs of single phase embodiments, respectively; a nomenclature typical for CPU motherboards. When $V_{com}$ is greater than $V_{up}$, $S_r$ is disabled for all phases and $T_{on}$ is extended for all phases corresponding to the same $i_{sum}$ (since a multi-phase converter can be arranged to group phases in different ways, each developing a different $V_{com}$ from a respective $i_{sum}$). When $V_{com}$ again decrease to $V_x$, $S_r$ is again enabled and steady-state operation is resumed. Results of simulation with $V_{in}$=8.4V, Vo=1.8V, $T_{off\_min}$=100 ns, L=120 nH, $f_s$=800 kHz, load step-up=55 A and di/dt=100 A/µs with and without the single step step-up improvement in accordance with the invention are shown in FIG. 23 for comparison. From these waveforms, it is seen that the two-phase COT in accordance with the invention exhibits no undershoot but ring-back which may be outside of the acceptable range of Vo is observed. The undesirable ring-back is due to $S_r$ being disabled for both (or all) phases and accelerates transfer of energy to the load that results in severe overshoot of the output voltage. However, interleaving is lost and total $T_{on}$ overlap occurs which causes twice (or a multiple equal to the number of phases) the amount of energy necessary to be delivered for a brief period (the duration of the first ramp signal to achieve switching pulse turn-off after returning to steady-state operation) as steady-state operation is resumed). Therefore, if the ring-back is acceptable for a particular application, the above arrangement is a simple and easily implemented multi-phase power converter embodiment having much improved step-up transient response not previously available in the art.

If the ring-back is not acceptable for a given application, a relatively simple technique has been found which avoids it. As noted above, the ring-back is due to the fact that while the beginning of the transient is detected by detection of $V_{com}$ exceeding $V_{up}$ to disable $S_r$ and extend the switching pulse, the termination of the switching pulse is still determined by the original control laws (e.g. comparison of $V_{th}$ and $S_r$, although $V_{th}$ and $S_r$ cannot be equal until a time well-after the termination of the transient that must be at least equal to the time required for $S_r$ to be generated and to reach $V_{th}$). Therefore, to eliminate ring-back in a multi-phase power converter in accordance with the invention, it is only necessary to provide for the termination of the transient to terminate $T_{on}$. Recalling from the above discussion and illustration of FIGS. 15 and 19, it is observed that in the single phase embodiments of the invention, $T_{on}$ terminates at the minimum steady-state value of $V_{com}$, $$V_{com\_min} = V_{th}/(1 + ((V_{th} - Vo) R_i)/L S_r).$$

Note that $V_{com\_min}$ changes as $V_{in}$ and Vo change. If the control adopts an adaptive on time control such that $S_r$ changes with $V_{in}$ and Vo to fix the steady-state frequency, $V_{com\_min}$ will also be fixed as $V_{in}$ and Vo vary and thus $V_{com\_min}$ can be a fixed threshold value. Therefore, it is clear that ring-back can be avoided using an additional threshold comparison but doing so requires either use of a variable threshold voltage for comparison with $V_{com}$ or adaptive circuitry to vary the slope of $S_r$.

The inventors have discovered two simplified techniques and circuits implementing those techniques which will be discussed below in connection with FIGS. 24A and 25A and FIGS. 24B and 25B with simulation results shown in FIGS. 26A and 27A and FIGS. 26B and 27B, respectively. Essentially, both of these techniques provide for extending the $T_{on}$ period without disabling $S_r$ but resetting $S_r$ as well as terminating $T_{on}$ upon detecting termination of the step-up transient. In the illustrations of these two techniques the terms $V_{top}$ is used in the same sense and is equal to $V_{up}$ and $V_{bot}$ is used in the same sense of and is equal or approximates $V_{com\_min}$ and is a fixed threshold value.

Figure 24A:
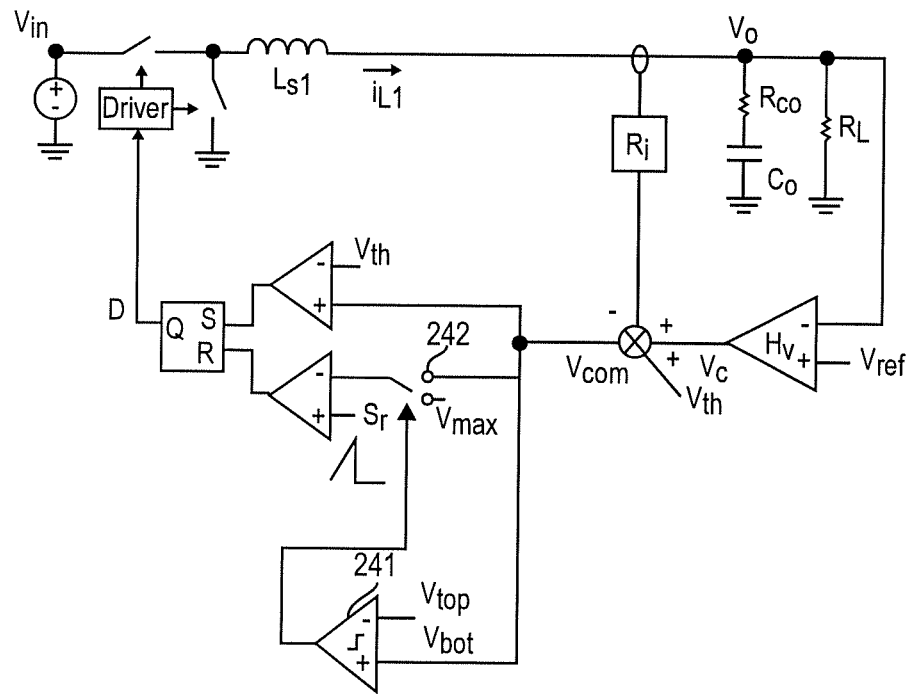
Figure 25B:
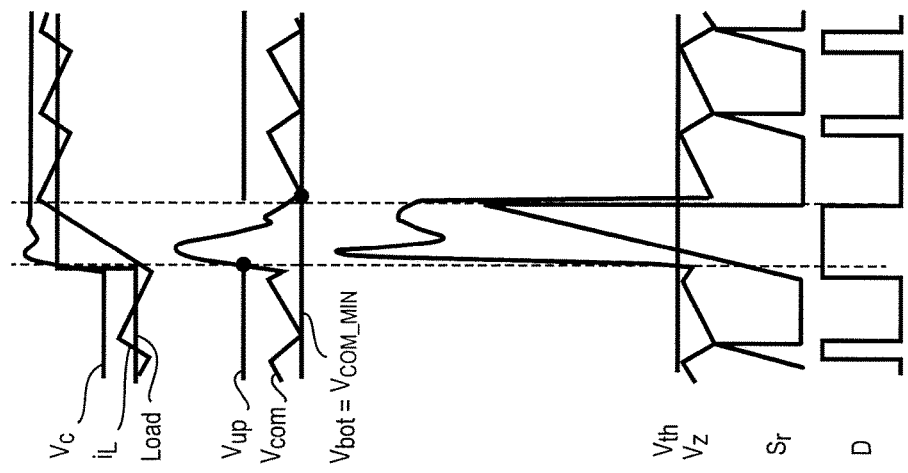
Figure 25A:
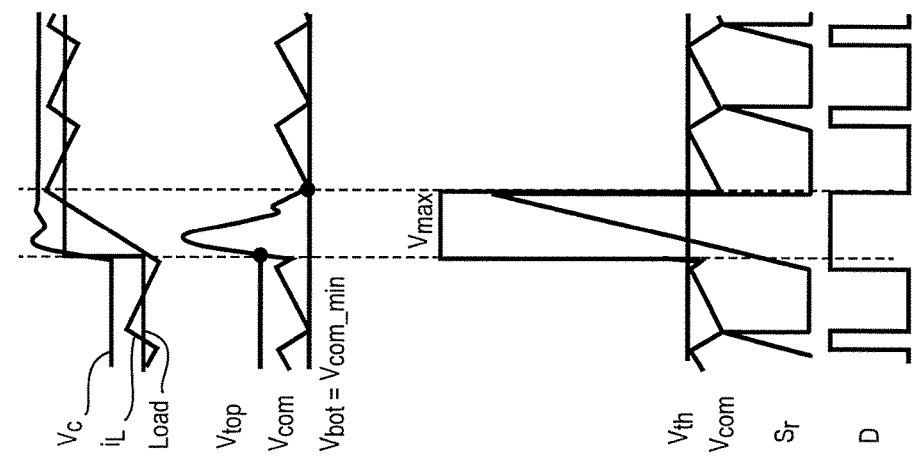

The circuit implementing the first of these techniques is illustrated in FIG. 24A and its operational waveforms are illustrated in FIG. 25A, When the beginning of a step-up transient is detected in the manner described above by $V_{com}$ exceeding $V_{top}$ as detected by a voltage range detector (essentially a double comparator) 241 the turn-off mechanism for $T_{on}$ is modified to substitute a substantially arbitrary maximum voltage, $V_{max}$ for $V_{com}$, as schematically depicted by switch 242, such that $S_r$ continues to increase (with constant slope) but ordinarily does not terminate $T_{on}$ unless the ramp reaches a voltage from which other circuitry must be protected (and causing a step in the transient response). Rather, when $V_{com}$ again returns to $V_{bot}$ at the end of the step-up transient, $V_{com}$, which is then less than $S_r$ is re-substituted for $V_{max}$ and $T_{on}$ is terminated while $S_r$ is concurrently reset to resume steady-state operations, as shown in FIG. 25A.

Figure 24B:
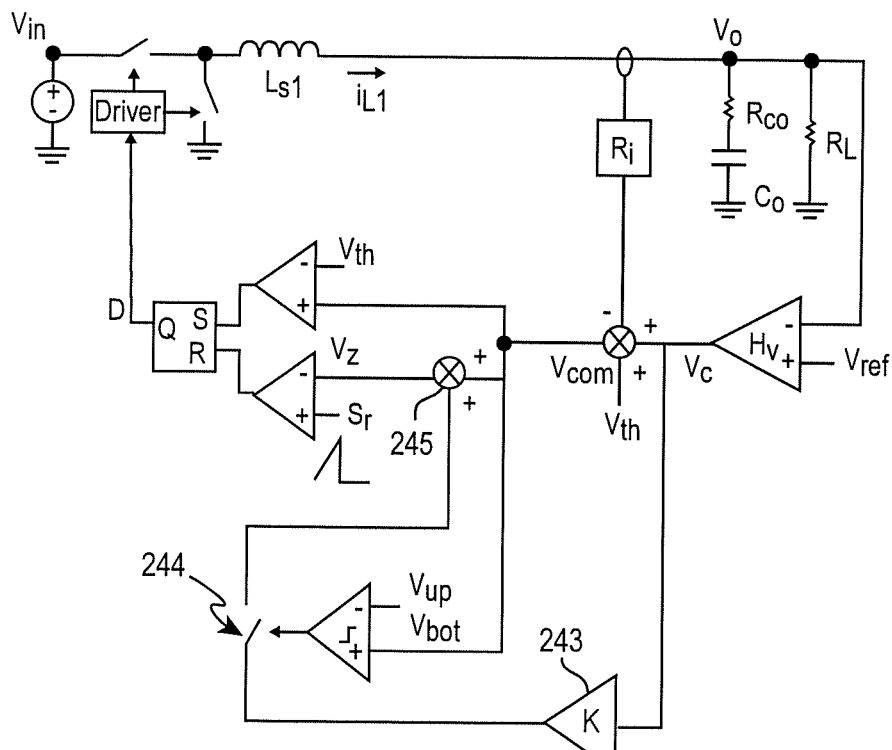

The second technique is embodied in the circuit schematically illustrated in FIG. 24B with explanatory operational waveforms illustrate in FIG. 25B. In this technique and circuit, a feedback signal is developed from $V_c$ with a gain of K as shown at 243. The beginning and termination of the step-up transient are detected in the same manner as that described above in connection with the first technique and during that transient, the feedback signal $K*V_c$ is supplied, as schematically depicted by switch 244 to multiplier 245 and injected into $V_{com}$ to form signal $V_z$ for comparison with $S_r$. When $V_{com}$ again returns to $V_{bot}$ at the end of the step-up transient, the injected signal is removed from $V_z$ to return to $V_{com}$, which is less than $S_r$ and $T_{on}$ is terminated while $S_r$ is concurrently reset to resume steady-state operations.

For both of these techniques, the location of $V_{up}$ is only critical for small-load step-up transient detection. If $V_{up}$ is too close to $V_x$, false transient detections may occur but false detections have no impact on the actual behavior of the system because $S_r$ is not disabled and the normal mechanism for terminating $T_{on}$ remains in place and operational. On the other hand, if $V_{up}$ is too large, small step-up transients may not be detected. In general, however, this second technique allows $V_{up}$ to be placed even closer to $V_{th}$ than in embodiments in which $S_r$ is disabled. Either of these two techniques in which $S_r$ is not disabled may be utilized in either single phase or multi-phase power converters to achieve single step step-up transient response.

Figure 26A:
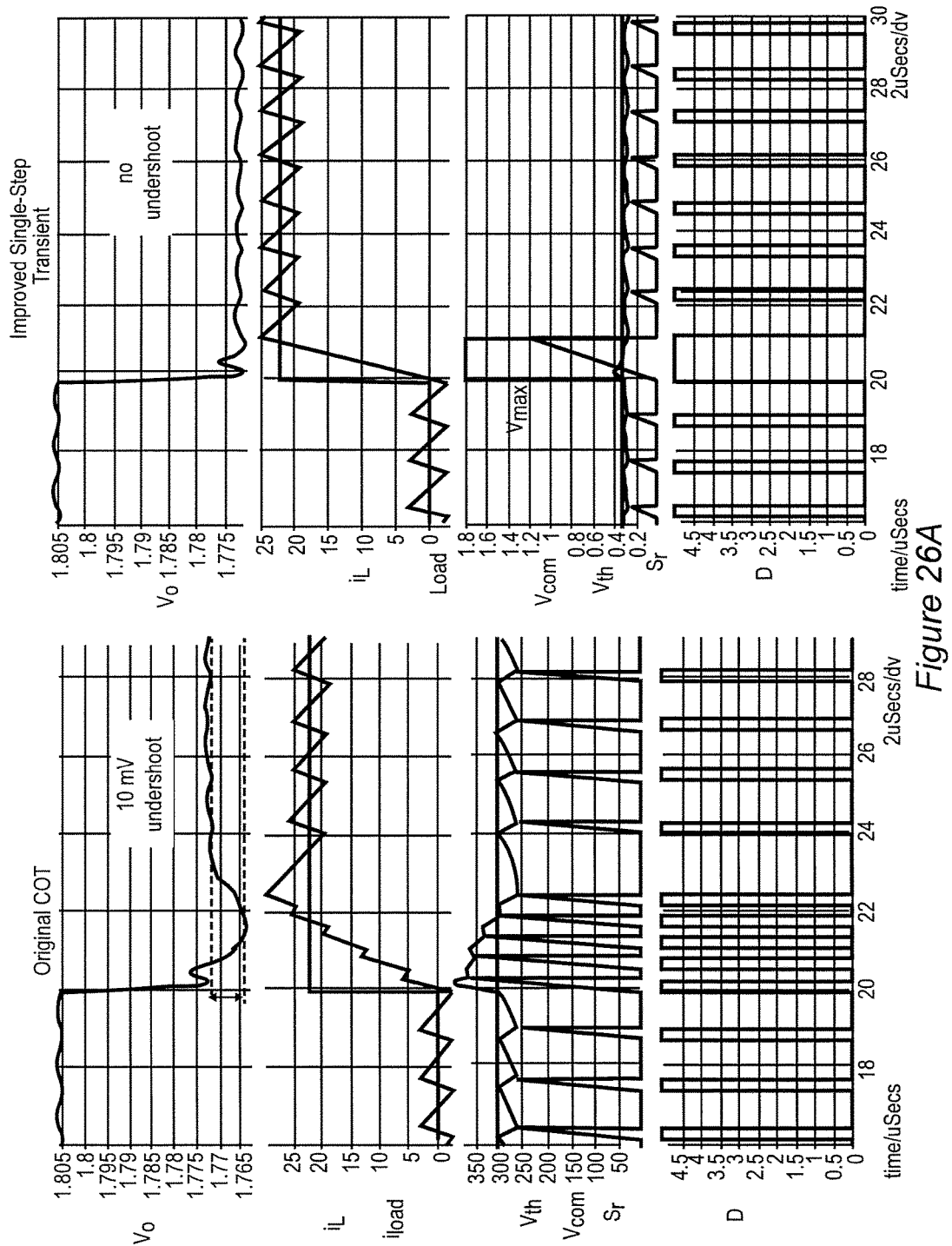
FIGS. 26A and 26B illustrate comparisons of step-up transient waveforms of an RPM power converter without and with the variant form of the invention illustrated in FIGS. 24A and 24B, respectively.
Figure 26B:
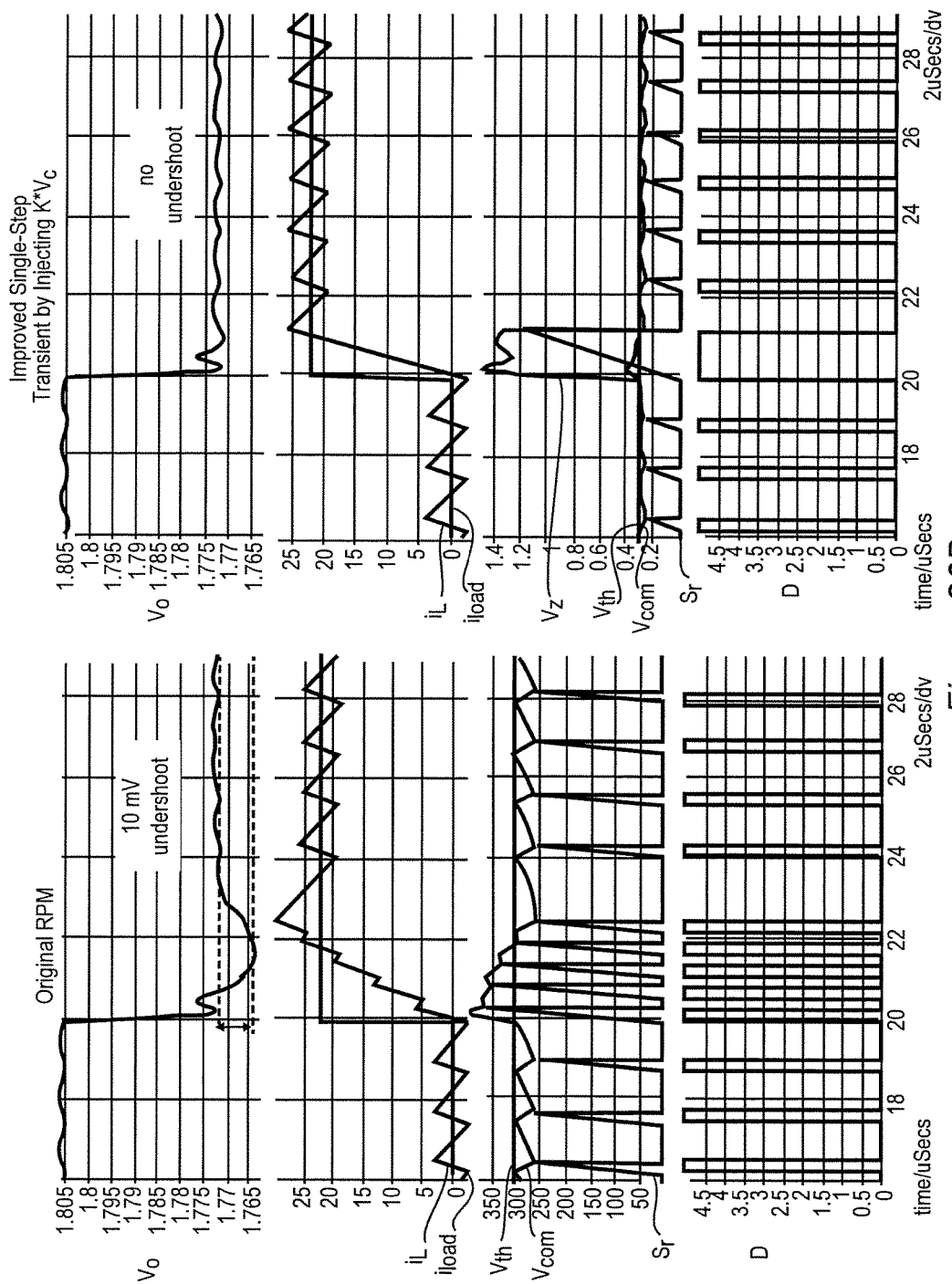
Figures 27A, 27B:
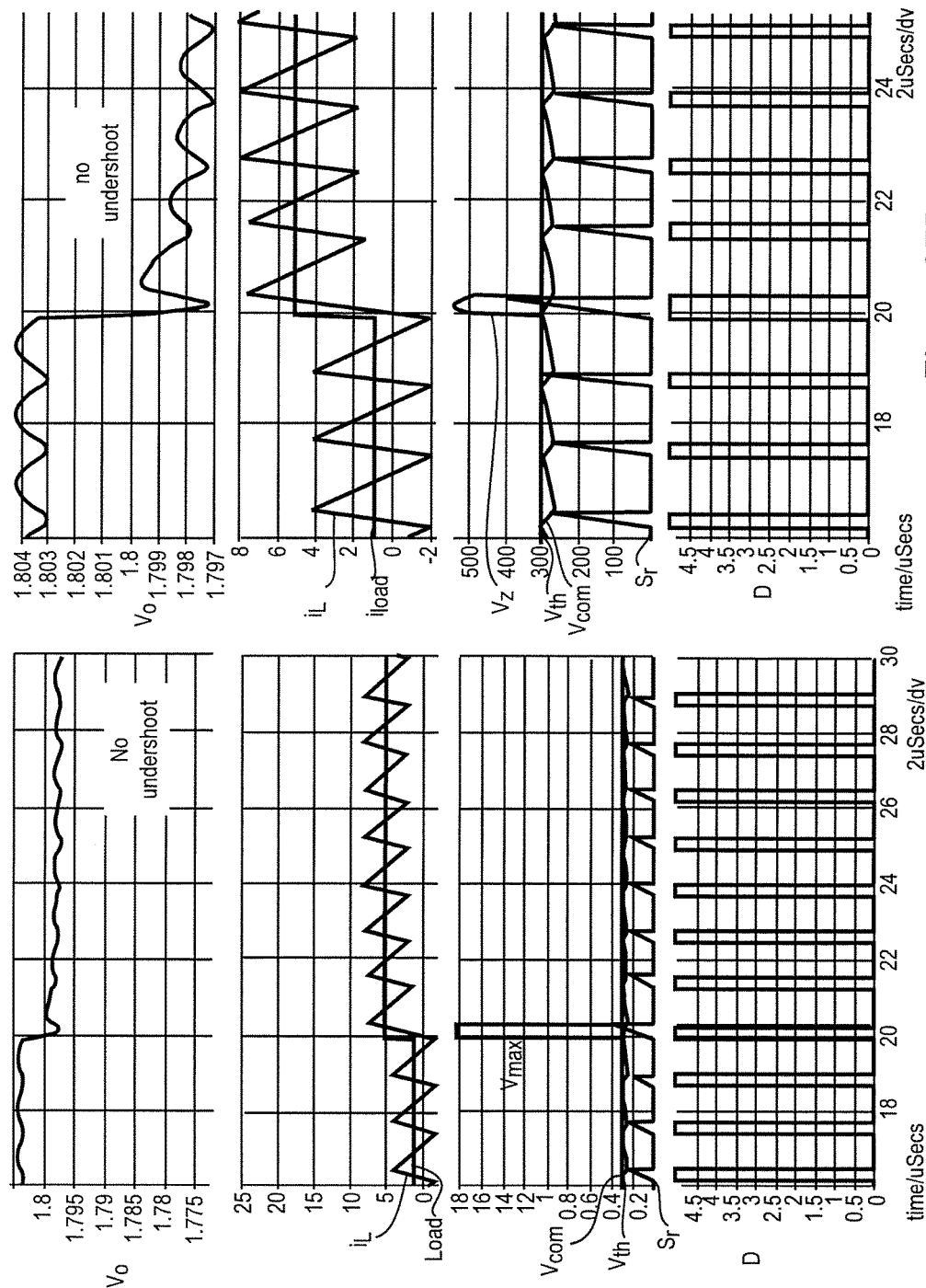
FIGS. 27A and 27B illustrates step-up transient waveforms similar to those of FIGS. 26A and 26B for a load transient of reduced magnitude, FIGS. 28A and 28B and FIGS. 29A and 29B respectively illustrate application and step-up transient waveforms of the variant forms of the invention with injected feedback to a COT power regulator.
Figure 28A:
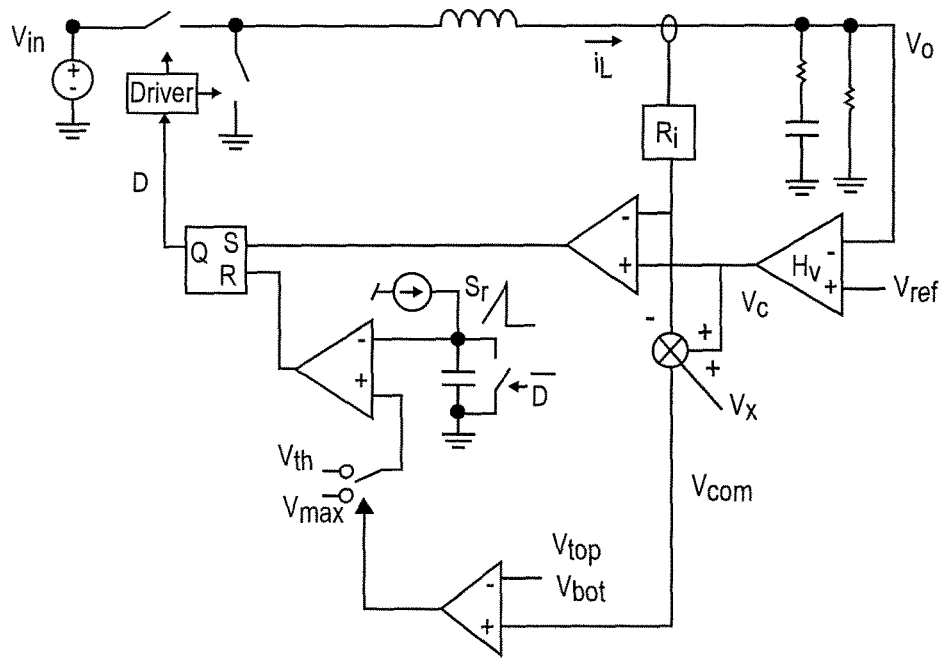
Figure 28B:
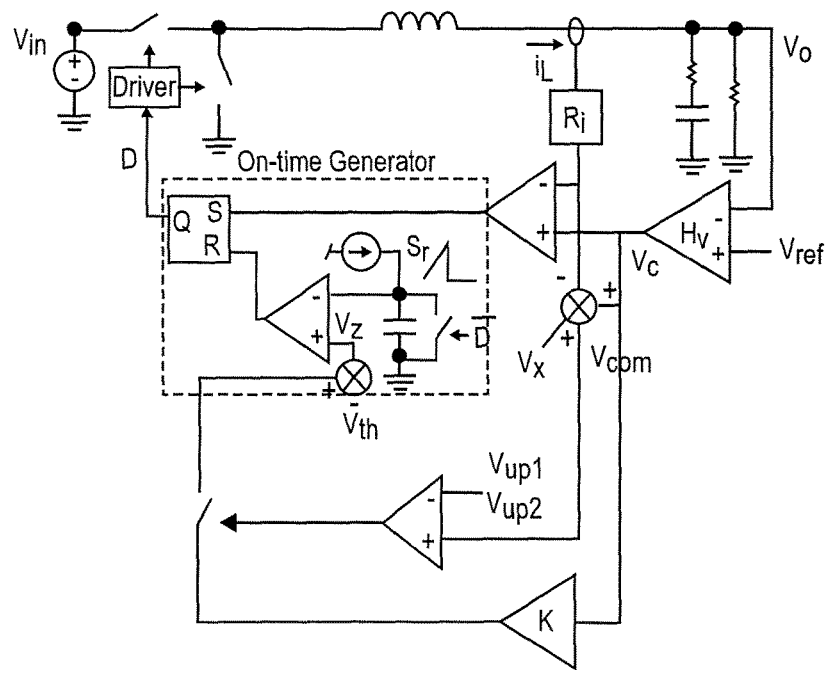

Both of these techniques have been simulated with the circuit and operating parameters of $V_{in}$=8.4V, Vo=1.8V, $T_{off\_min}$=200 ns, L=280 nH, $f_s$=800 kHz, load step-up=22 A and di/dt=320 A/µs. The waveforms resulting from the respective simulations are shown in FIGS. 26A and 26B for comparison with an RPM power converter without the invention. Waveforms resulting from further simulations with a reduced step-up transient of 4 A is shown in FIGS. 27A and 27B, again showing that these techniques are effective even on very small step-up transients. It should be understood that step-up transients of less than 4 A are likely to not require plural steps even in the absence of the invention for RPM control but that step-up transients that are likely to require plural steps can be reduced in duration and regulation accuracy improved by achieving single step transient response in accordance with the invention.

Figure 29A:
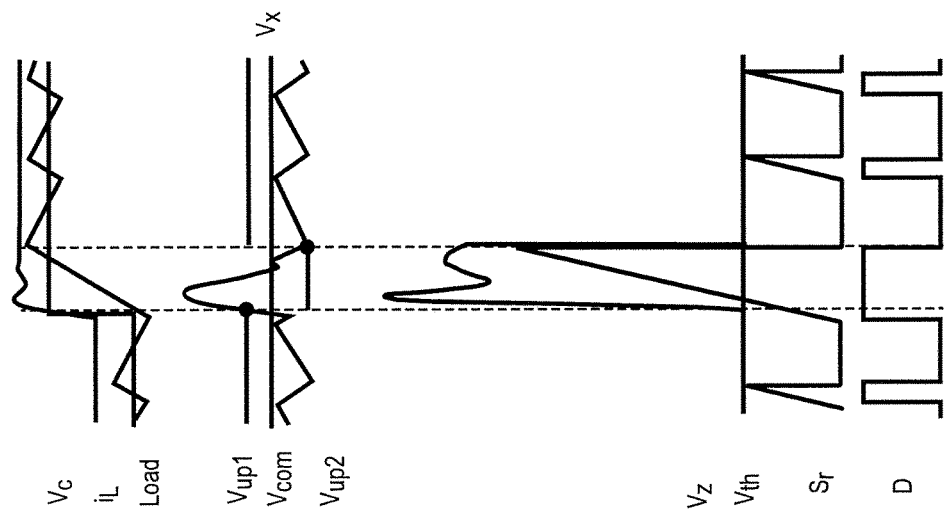
Figure 29B:
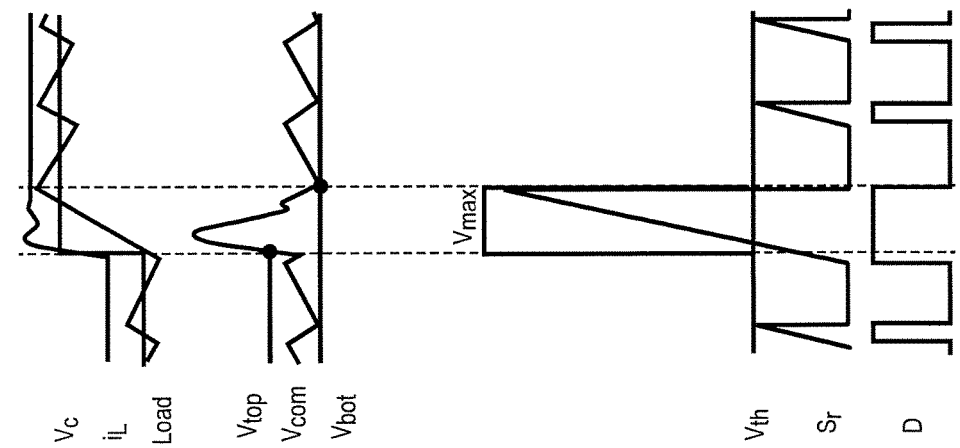
Figure 30A:
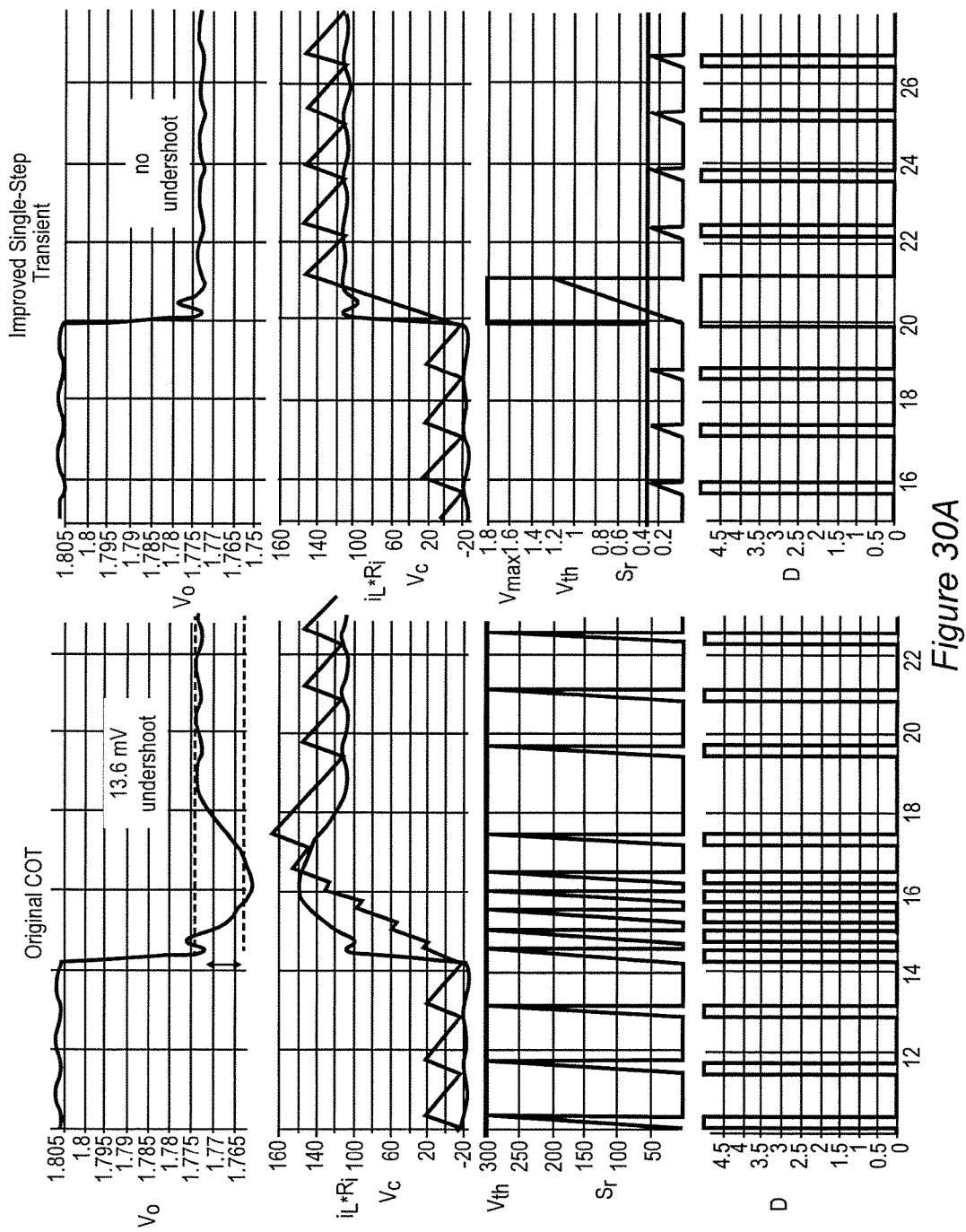
FIGS. 30A and 30B illustrates a comparison of step-up transient waveforms of a COT power converter without and with the variant form of the invention.
Figure 30B:
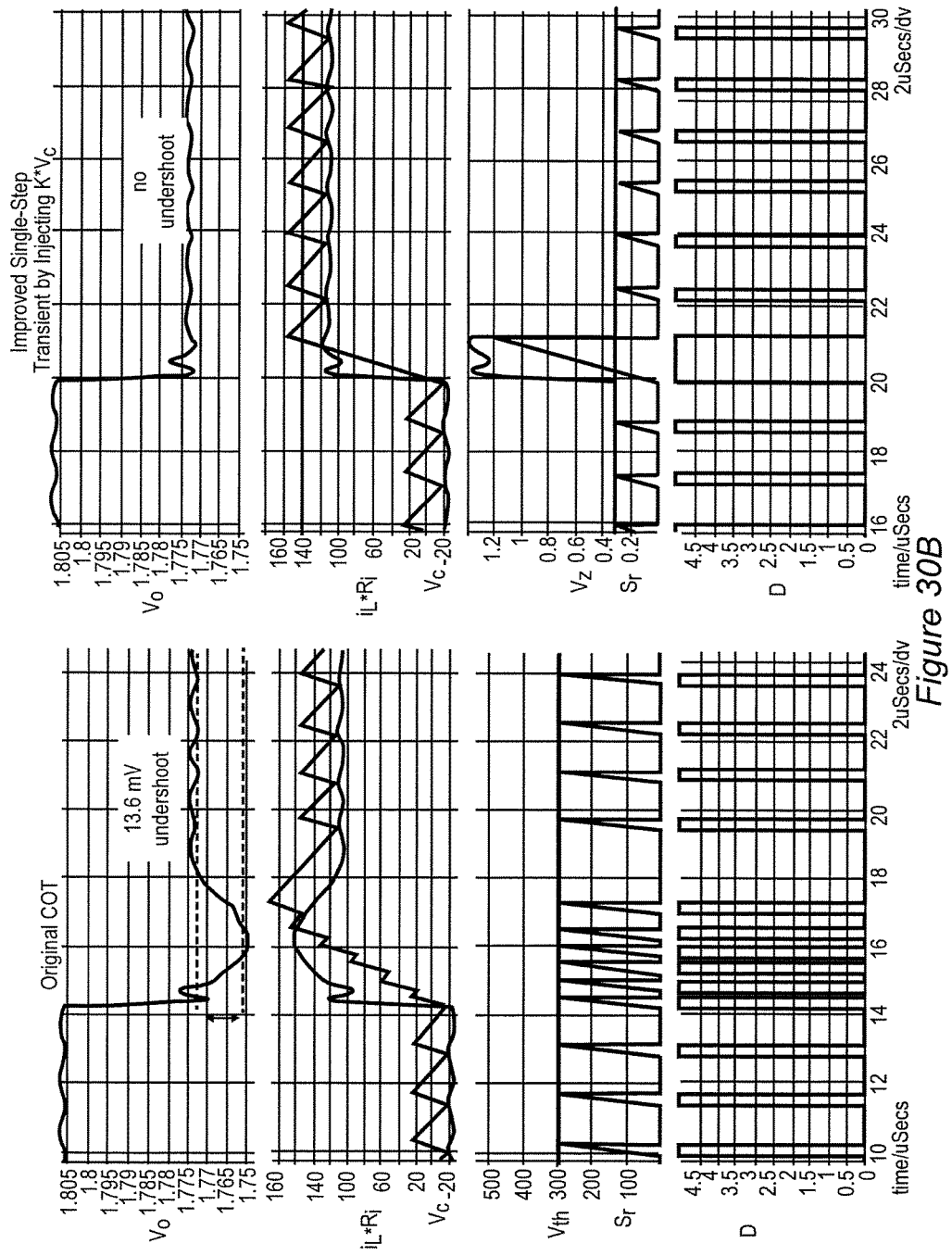
Figures 31A, 31B:
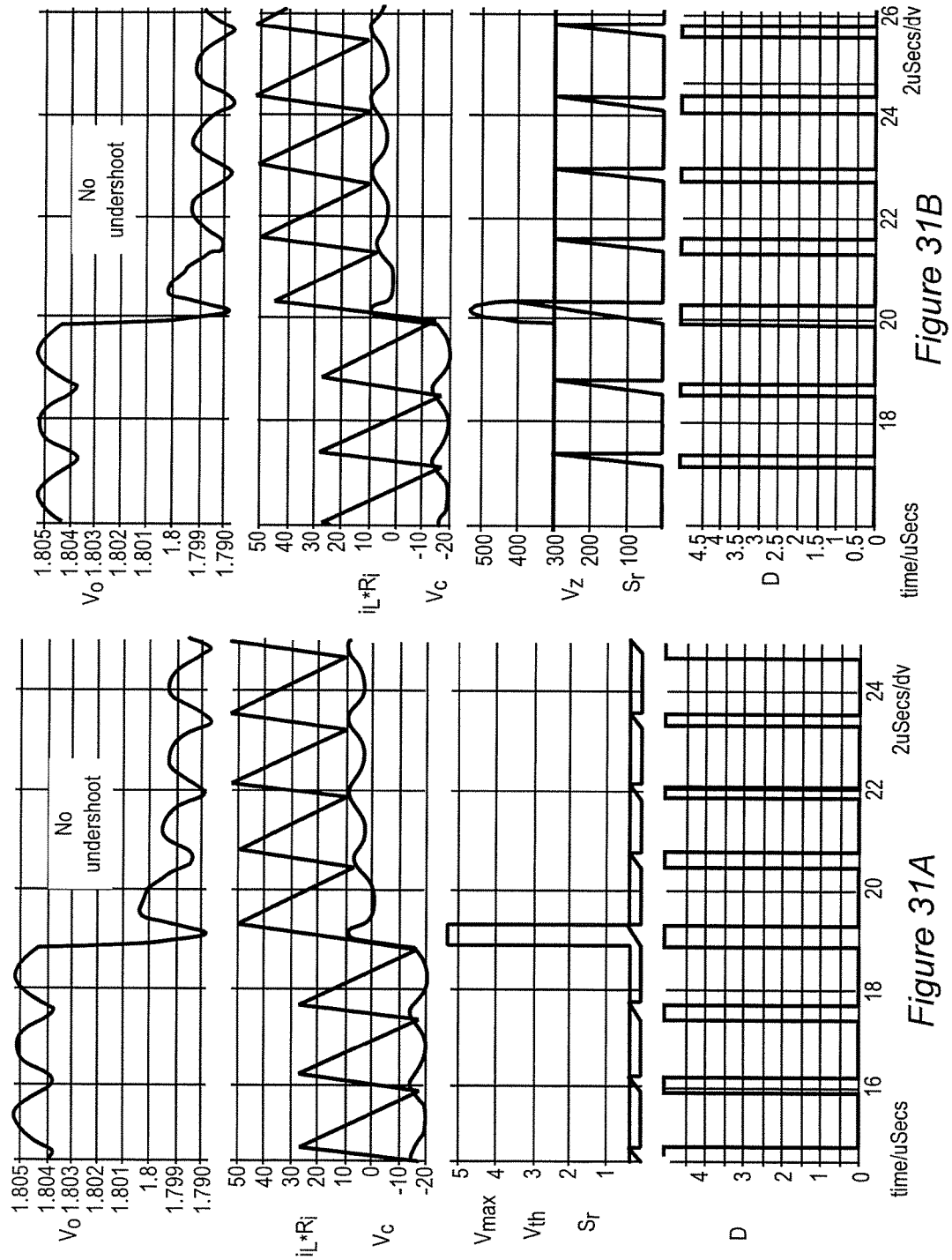
FIGS. 31A and 31B illustrate step-up transient waveforms of the variant forms of the invention similar to FIGS. 30A and 30B but with a load transient of reduced magnitude, FIGS. 32A and 32B schematically illustrate application of the variant forms of the invention of FIGS. 24A and 24B to a two-phase COT power converter.

These two techniques described above in connection with power converters with RPM control which do not interrupt $S_r$ can also be applied to single phase and multi-phase COT control power converters as shown in the schematic diagrams of FIGS. 28A and 28B and FIGS. 31A and 31B, respectively. It will be appreciated that the circuit of the COT power converter of FIGS. 28A and 28B includes comparison to two thresholds and substitution of $V_{max}$ (in FIG. 28A) and $V_z$ (in FIG. 28B) for $V_{th}$ for comparison with $S_r$ that corresponds to the circuitry added to the RPM power converter of FIGS. 24A and 24B, respectively, and thus need not be further discussed. The operational transient waveforms shown in FIGS. 29A and 29B also show the ramp approaching but not reaching $V_{max}$ and $V_z$, respectively, with $S_r$ being reset upon $V_{com}$ reaching $V_{bot}$. The comparison of simulation results in FIGS. 30A and 30B under the same parameters as in simulations of RPM converter performance also show that single step transient response is achieved by both techniques and that no undershoot is evident. Results of simulations using the two respective techniques of FIGS. 24B and 25B but with a smaller step-up transient of 4 Amperes and a di/dt–320 Amperes/µsec are illustrated in FIGS. 31A and 31B, respectively.

Figure 32A:
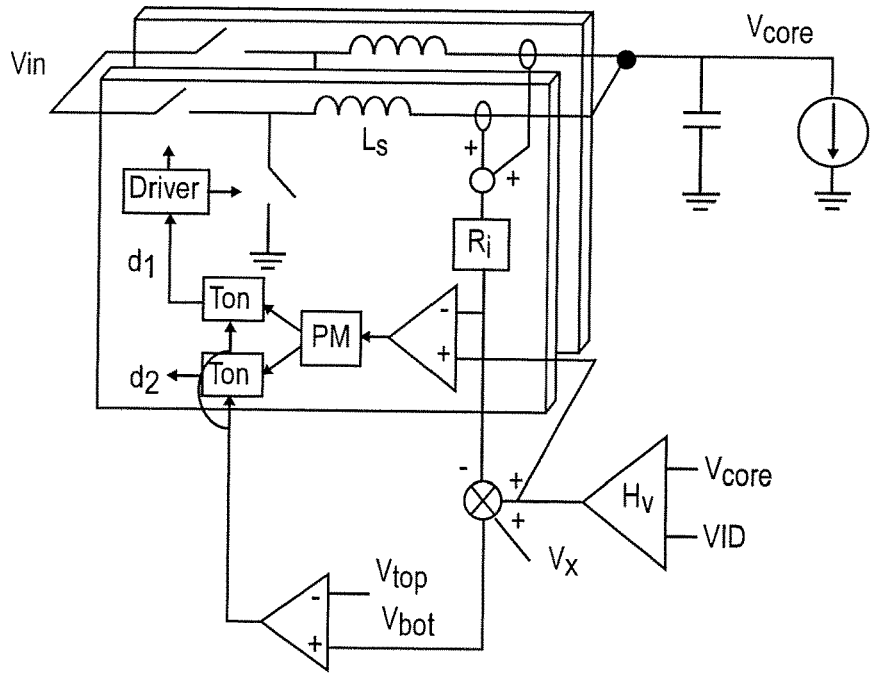
Figure 32B:
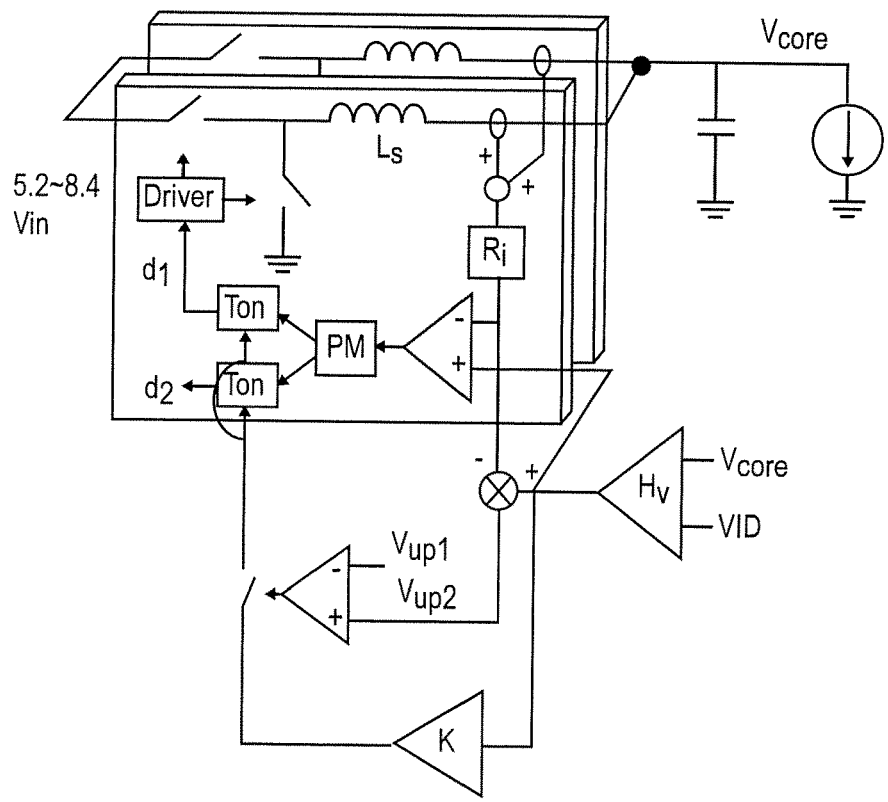
Figure 33A:
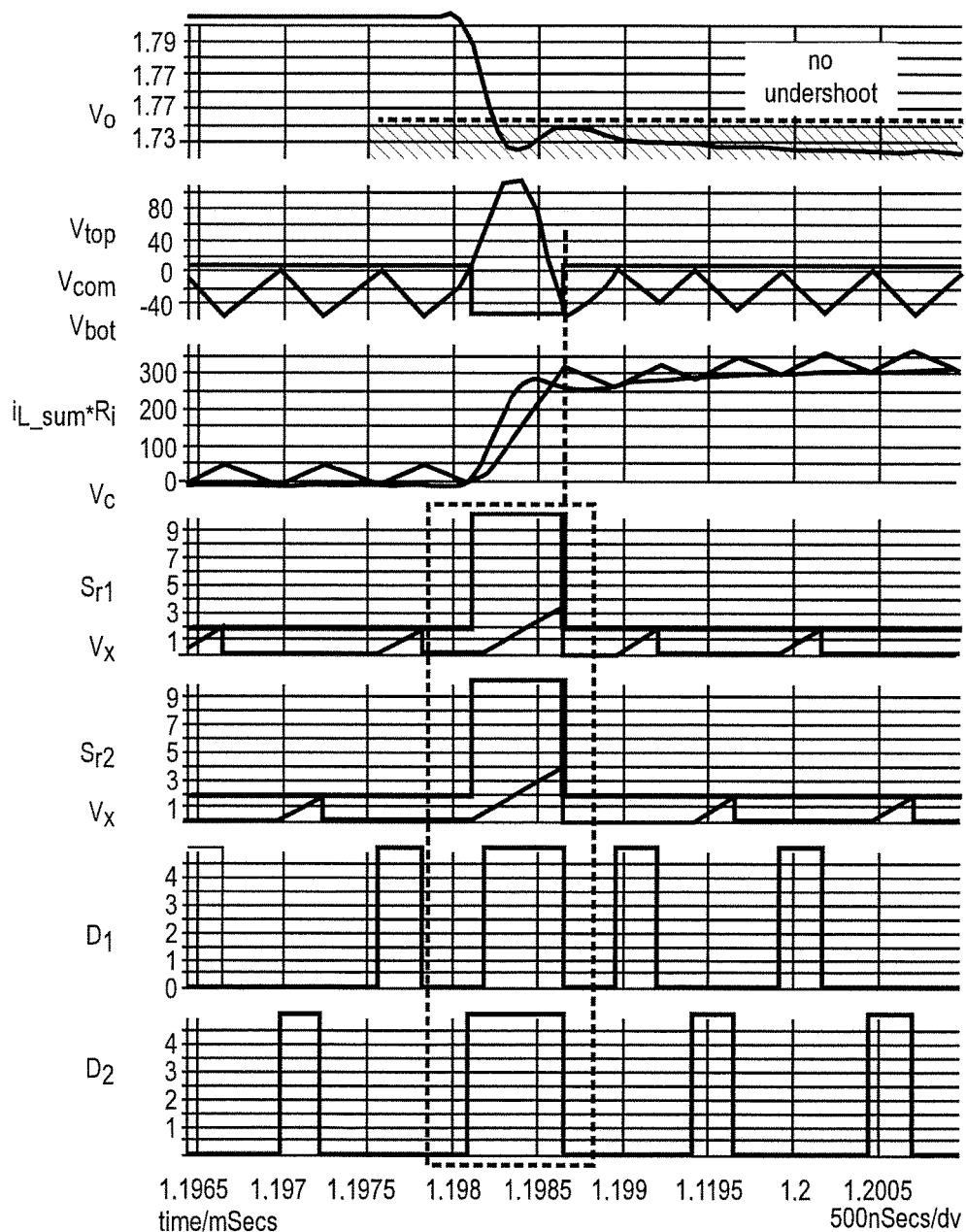
FIGS. 33A and 33B illustrates a comparison of step-up transient waveforms of a two-phase COT converter without and with the variant form of the invention, respectively.
Figure 33B:
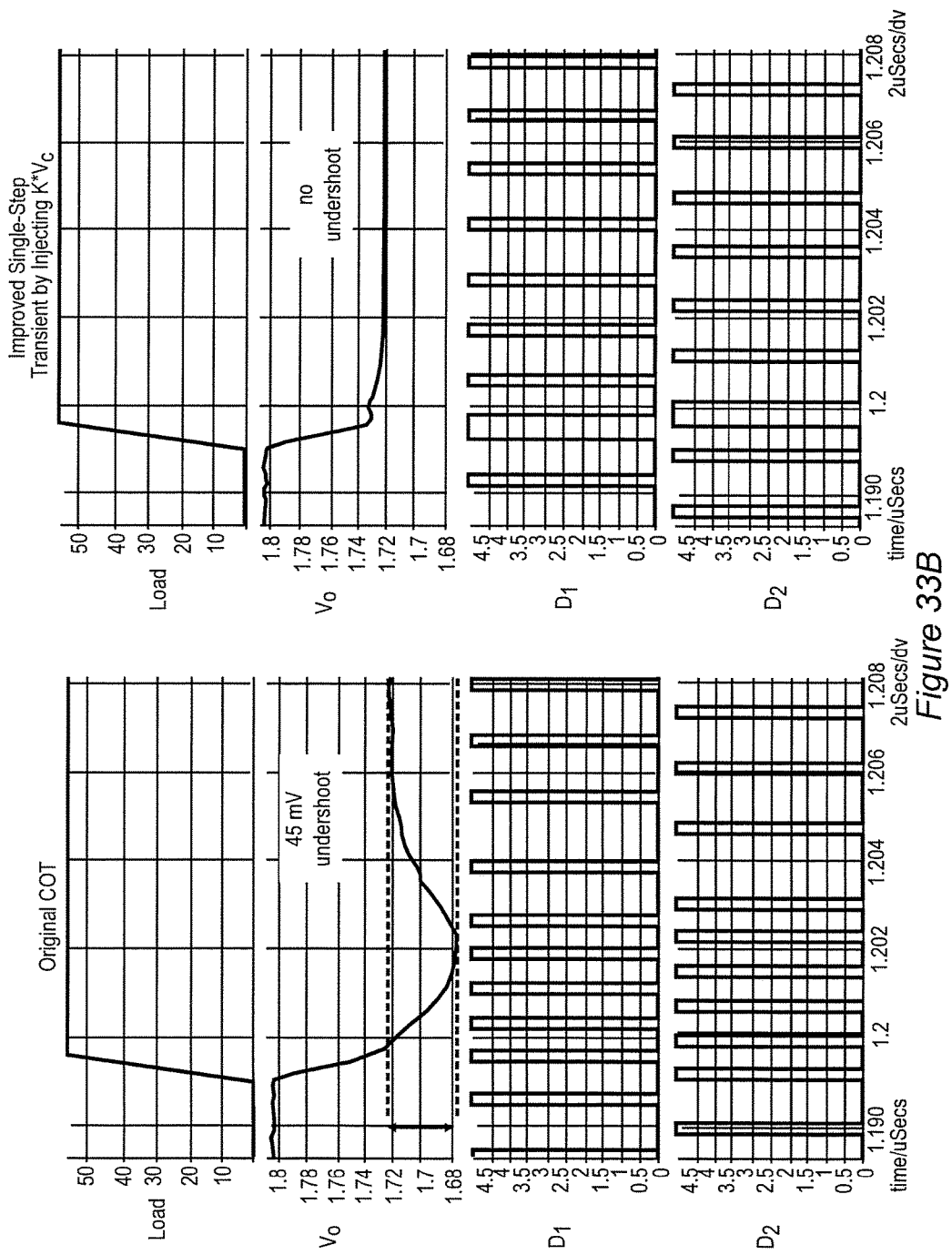

In the schematic diagrams of FIGS. 32A and 32B, the same circuitry used in each of these respective techniques is employed to control the comparison with $S_r$ but is simply indicated as a control input to the $T_{on}$ generators of the respective phases. The results of simulations (with load step-up of 55 A and di/dt=100 A/µs but other parameters unchanged) are illustrated in FIGS. 33A and 33B, respectively, do not exhibit undershoot or ring-back. Partial overlapping of the $T_{on}$ of the respective phase can also be seen in FIGS. 33A and 33B.

In view of the foregoing, it is clearly seen that the invention provides achieves single step response to step-up transients in either COT control or RPM control power converters of single or multiple phases by either disabling $S_r$ or alter the voltage with which $S_r$ is compared upon detection of a voltage based on input and output converter voltages and inductor current of the power converter being equal to thresholds corresponding to the excursion range of that voltage during steady-state operation. Thus, the invention provides for step-up transient response to be optimally rapid without undershoot or ring-back that can compromise output voltage regulation of the power converter.

While the invention has been described in terms of several preferred embodiment s and applications and variants thereon, those skilled in the art will recognize that the invention can be practiced with modification within the spirit and scope of the appended claims.

We claim:

1. A power converter comprising
a pulse generator for generating switching pulses for controlling duration of connection of said power converter to a power source based on a comparison of an output voltage of said power converter with a reference voltage,
a circuit for developing a control voltage corresponding to a combination of signals representing a reference voltage, output voltage and inductor current of said power converter,
a detector receiving a threshold voltage bounding said control voltage during steady-state operation of said power converter for determining when said control voltage corresponding to said combination of threshold voltage, output voltage and inductor current of said power converter represents a step-up load transient by comparison of said control voltage with said threshold voltage, and
a control circuit responsive to an output of said detector for maintaining a switching pulse state from said pulse generator and connection of said power converter to said power source for a duration that said output of said detector indicates said step-up load transient.

2. The power converter as recited in claim 1, wherein said pulse generator generates pulses of constant on-time and variable duty cycle, depending on load, during steady-state operation.

3. The power converter as recited in claim 1, wherein said pulse generator terminates a pulse when a ramp voltage generated concurrently with pulses from said pulse generator equals said control voltage.

4. The power converter as recited in claim 1, wherein said power converter is a multi-phase power converter.

5. The power converter as recited in claim 2, wherein said detector detects a step-up load transient by determining when said control voltage is above a threshold that bounds said control voltage during steady-state operation.

6. The power converter as recited in claim 3, wherein said detector detects a step-up load transient by determining when said control voltage is above a threshold that bounds said control voltage during steady-state operation.

7. The power converter a recited in claim 5, wherein said detector disables termination of a pulse by said pulse generator.

8. The power converter as recited in claim 5, wherein said control circuit interrupts said ramp voltage during said step-up load transient.

9. The power converter as recited in claim 5, wherein said control voltage is increased for comparison with said ramp voltage.

10. The power converter as recited in claim 5, wherein a high voltage is substituted for said control voltage for a duration of said step-up load transient.

11. The power converter a recited in claim 6, wherein said detector disables termination of a pulse by said pulse generator.

12. The power converter as recited in claim 11, wherein said control circuit interrupts said ramp voltage during said step-up load transient.

13. The power converter as recited in claim 11, wherein said control voltage is increased for comparison with said ramp voltage.

14. The power converter as recited in claim 11, wherein a high voltage is substituted for said control voltage for a duration of said step-up load transient.

15. A method of operating a power converter, said method comprising steps of
generating pulses for controlling a switch to connect said power converter to a power source,
detecting a duration of a step-up load transient in said power converter, and
extending a pulse for controlling said switch for said duration of said step-up load transient wherein said extending step is performed by substituting a high voltage for a threshold voltage for comparison with a ramp voltage for a duration of said step-up load transient to terminate said pulse.

16. The method as recited in claim 15, wherein said pulses are of constant duration during steady-state operation.

17. The method as recited in claim 15 wherein said extending step is performed by amplifying a voltage that exceeds a threshold to develop a high voltage for comparison with a ramp voltage for a duration of said step-up load transient to terminate said pulse.

18. The method as recited in claim 15, wherein said power converter is a multi-phase power converter.

19. A method of operating a power converter, said method comprising steps of
   generating pulses for controlling a switch to connect said power converter to a power source,
   detecting a duration of a step-up load transient in said power converter, and
   extending a pulse for controlling said switch for a said duration of said step-up load transient wherein said extending step is performed by interrupting a ramp voltage generated concurrently with said pulses during steady state operation.

20. The method as recited in claim 17, wherein said pulses are of constant duration during steady-state operation.

* * * * *